July 5, 1966    M. L. GERBER    3,259,104
APPARATUS FOR MANUFACTURING A PRODUCT
Filed March 13, 1962    15 Sheets-Sheet 2
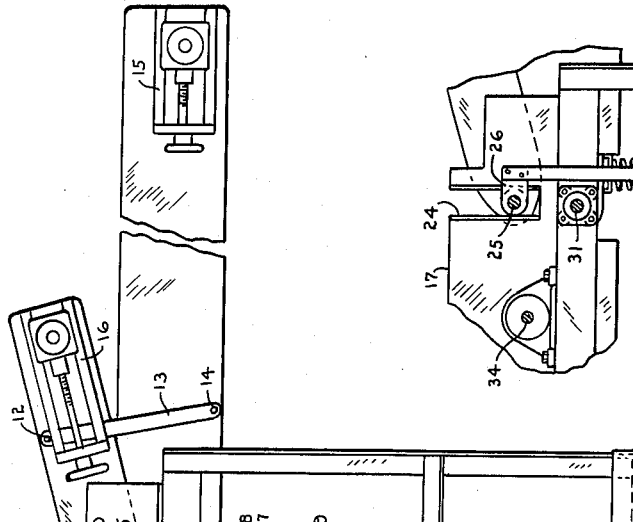
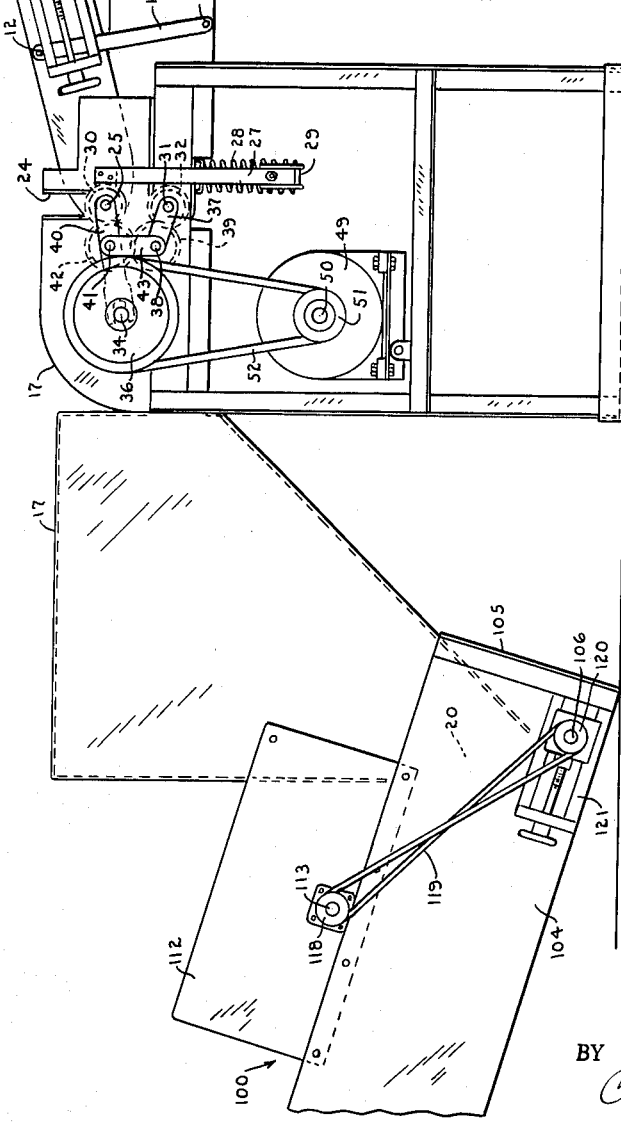
INVENTOR.
MILTON L. GERBER
BY Charles S. Penfold
ATTORNEY July 5, 1966  M. L. GERBER  3,259,104
APPARATUS FOR MANUFACTURING A PRODUCT
Filed March 13, 1962  15 Sheets-Sheet 3
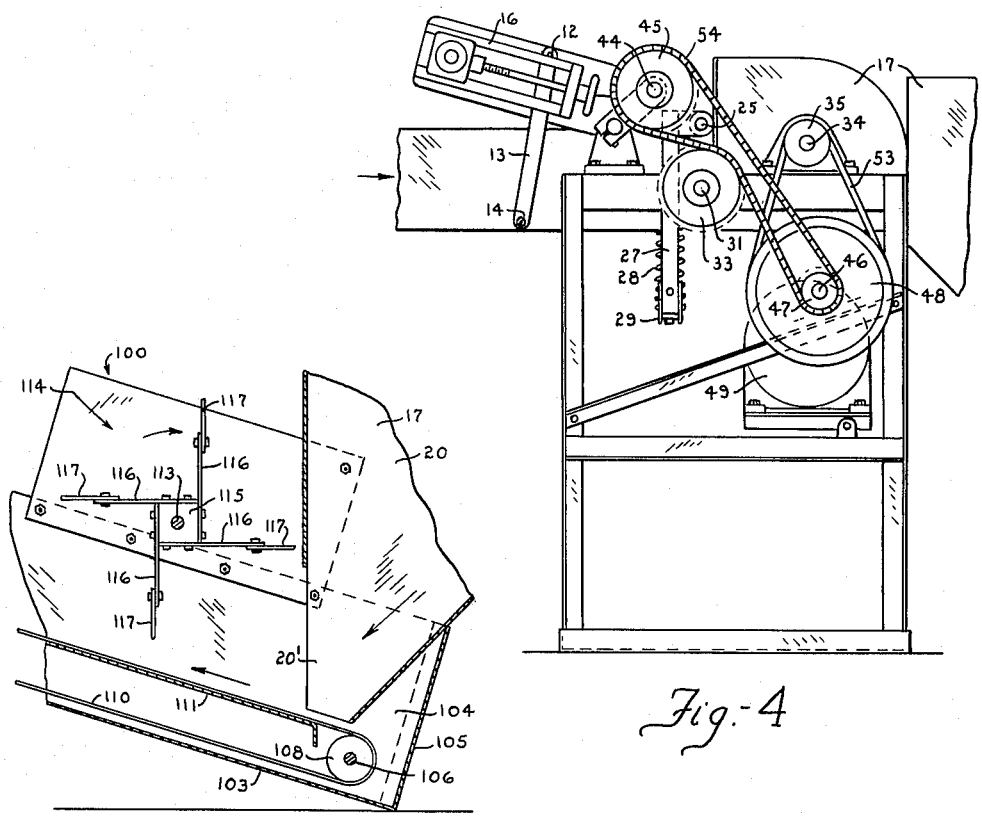
Fig.-4
Fig.-6
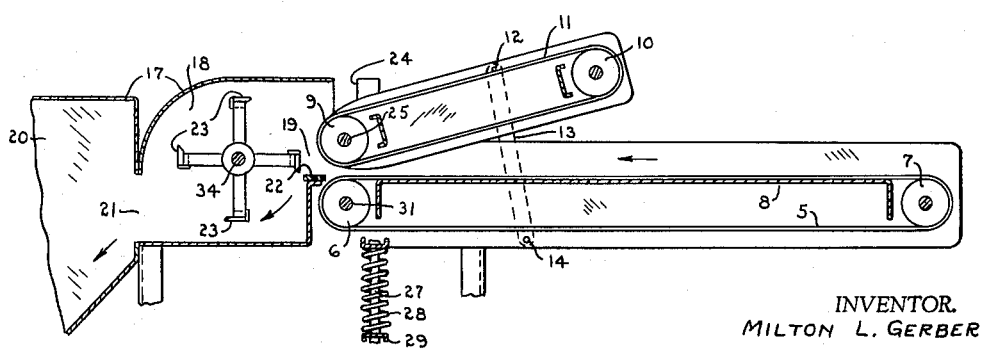
Fig.-5
INVENTOR.
MILTON L. GERBER
BY
Charles S. Penfold
ATTORNEY July 5, 1966 M. L. GERBER 3,259,104
APPARATUS FOR MANUFACTURING A PRODUCT
Filed March 13, 1962 15 Sheets-Sheet 4
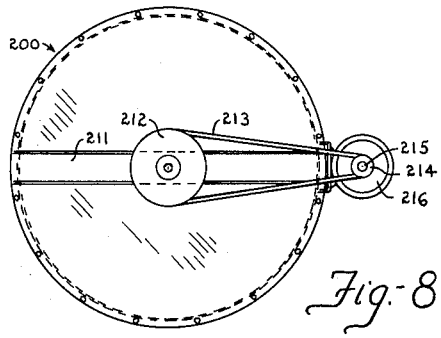
Fig.-8
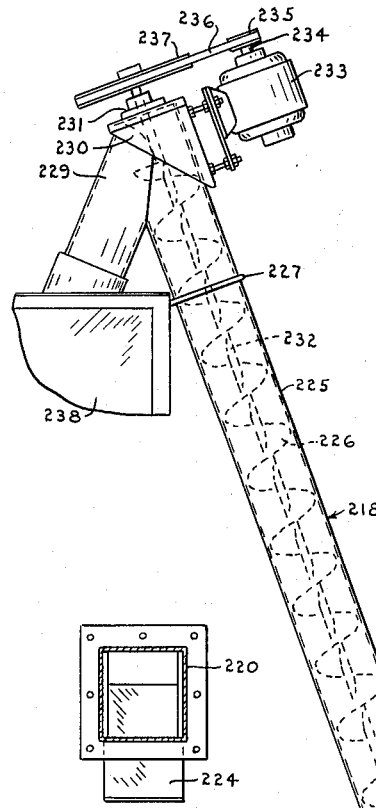
Fig.-10
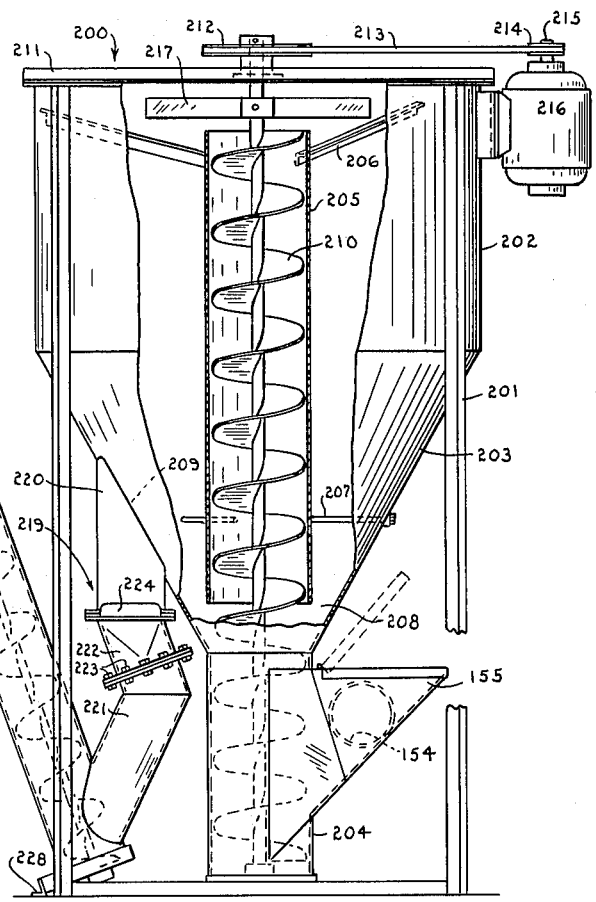
Fig.-9
Fig.-7
INVENTOR.
MILTON L. GERBER
BY Charles S. Penfold
ATTORNEY July 5, 1966  M. L. GERBER  3,259,104
APPARATUS FOR MANUFACTURING A PRODUCT
Filed March 13, 1962  15 Sheets-Sheet 5

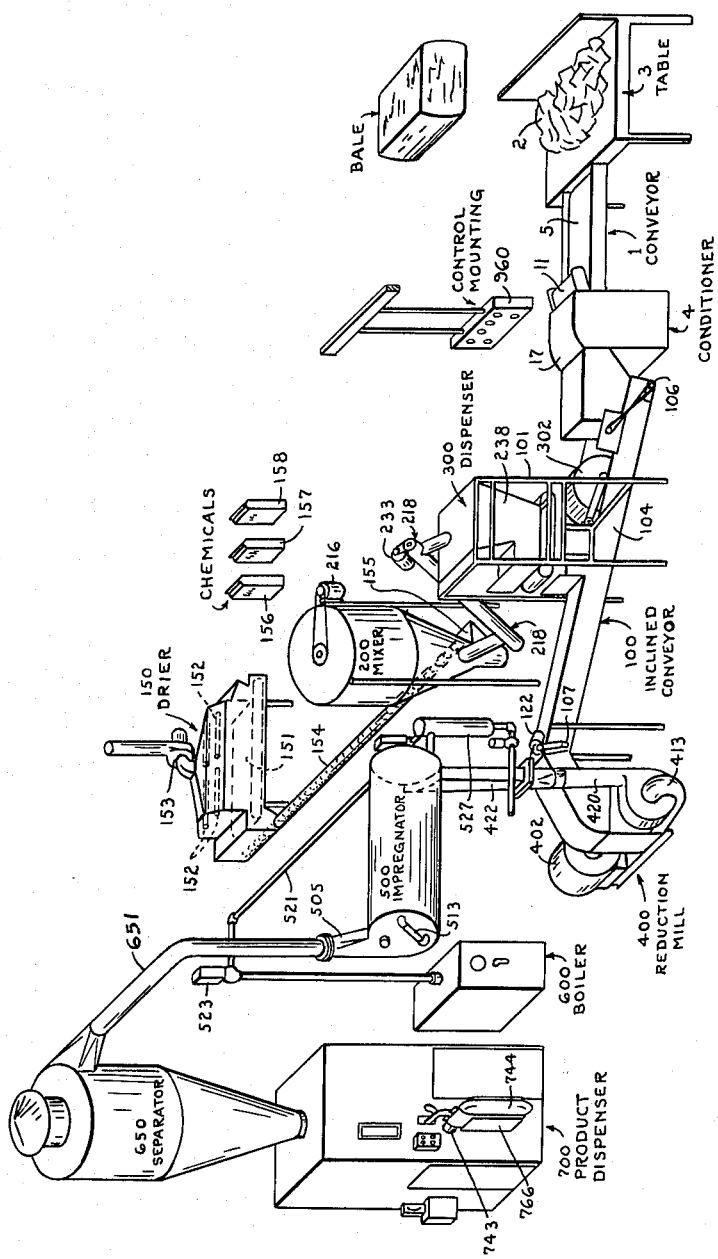

INVENTOR.
MILTON L. GERBER
BY Charles S. Penfield
ATTORNEY

July 5, 1966 M. L. GERBER 3,259,104
APPARATUS FOR MANUFACTURING A PRODUCT
Filed March 13, 1962 15 Sheets-Sheet 6

INVENTOR.
MILTON L. GERBER
BY
Charles S. Penfold
ATTORNEY

July 5, 1966   M. L. GERBER   3,259,104
APPARATUS FOR MANUFACTURING A PRODUCT
Filed March 13, 1962   15 Sheets-Sheet 7

INVENTOR.
MILTON L. GERBER
BY Charles S. Penfold
ATTORNEY

July 5, 1966 M. L. GERBER 3,259,104
APPARATUS FOR MANUFACTURING A PRODUCT
Filed March 13, 1962 15 Sheets-Sheet 8
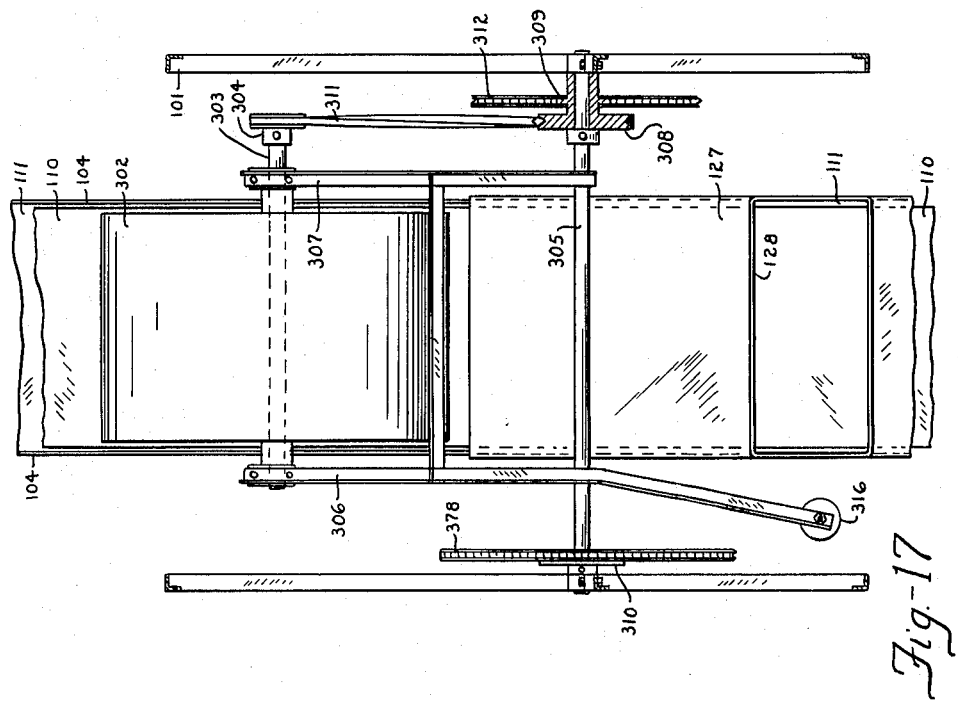
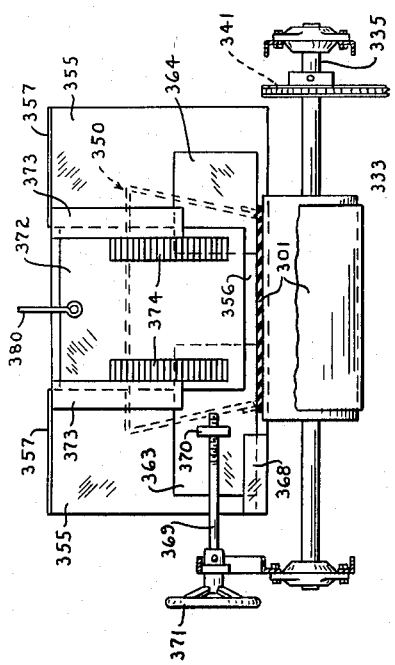
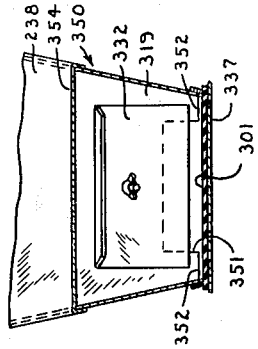
INVENTOR.
MILTON L. GERBER
BY
*Charles S. Penfield*
ATTORNEY

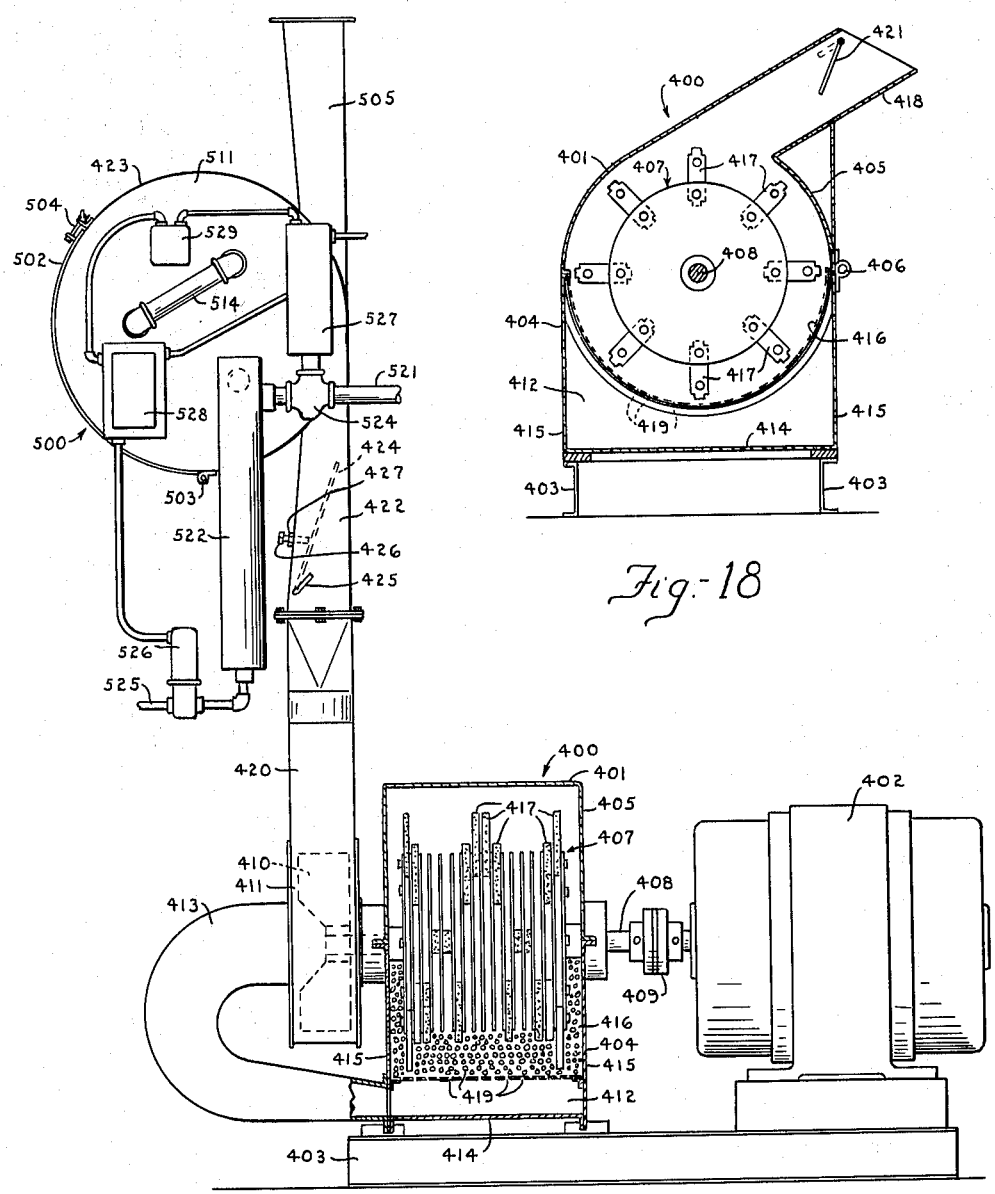

July 5, 1966 M. L. GERBER 3,259,104
APPARATUS FOR MANUFACTURING A PRODUCT
Filed March 13, 1962 15 Sheets-Sheet 10
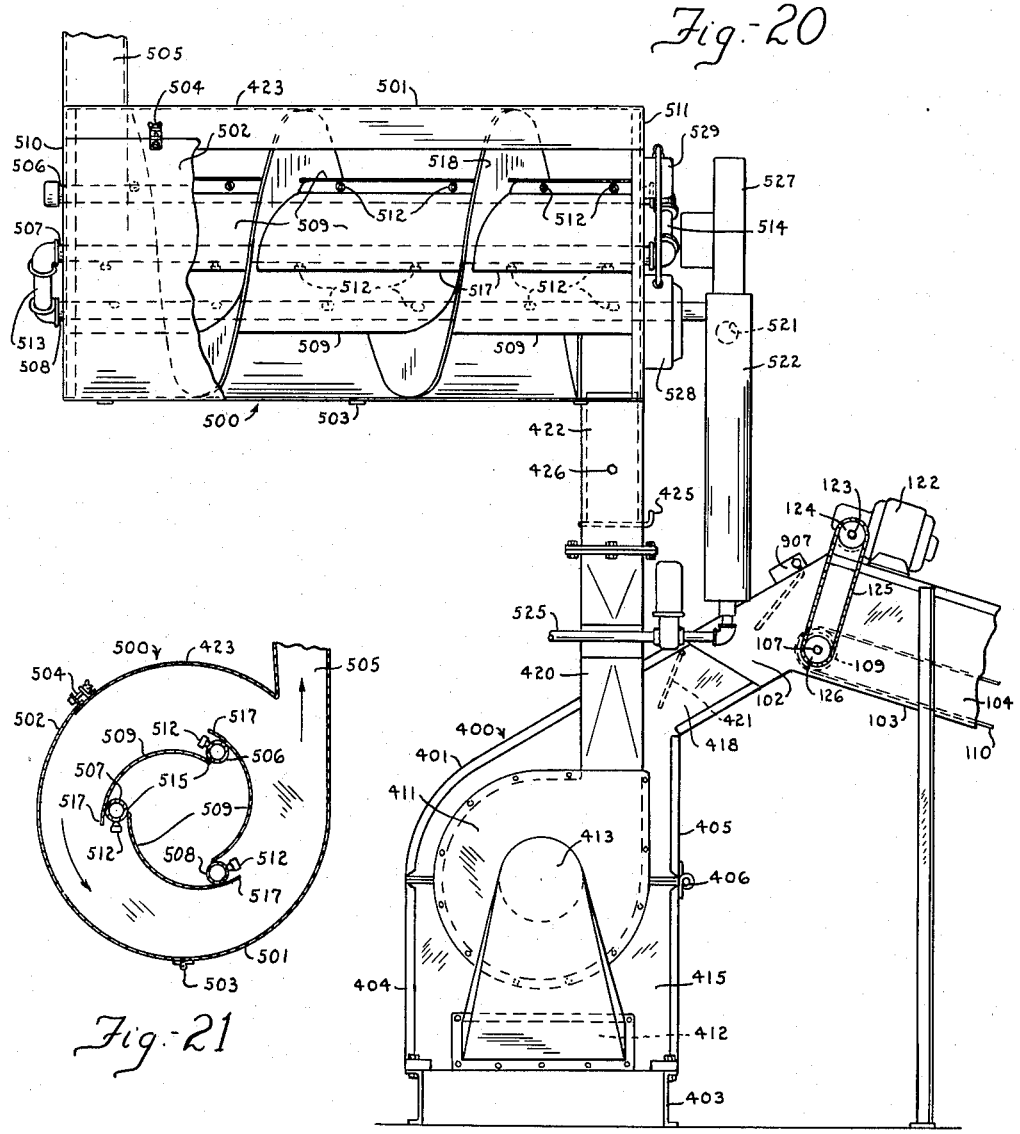
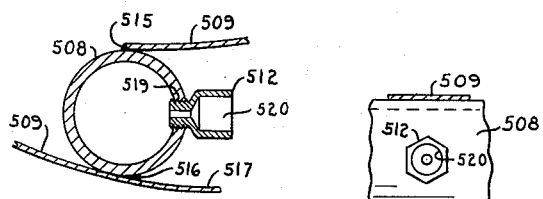
INVENTOR.
MILTON L. GERBER
BY
ATTORNEY July 5, 1966  M. L. GERBER  3,259,104
APPARATUS FOR MANUFACTURING A PRODUCT
Filed March 13, 1962  15 Sheets-Sheet 11

INVENTOR.
MILTON L. GERBER
BY
Charles S. Penfold
ATTORNEY

July 5, 1966  M. L. GERBER  3,259,104
APPARATUS FOR MANUFACTURING A PRODUCT
Filed March 13, 1962  15 Sheets-Sheet 12

INVENTOR.
MILTON L. GERBER
BY
Charles S. Penfold
ATTORNEY

July 5, 1966  M. L. GERBER  3,259,104
APPARATUS FOR MANUFACTURING A PRODUCT
Filed March 13, 1962  15 Sheets-Sheet 13

INVENTOR.
MILTON L. GERBER
BY Charles S. Penfold
ATTORNEY

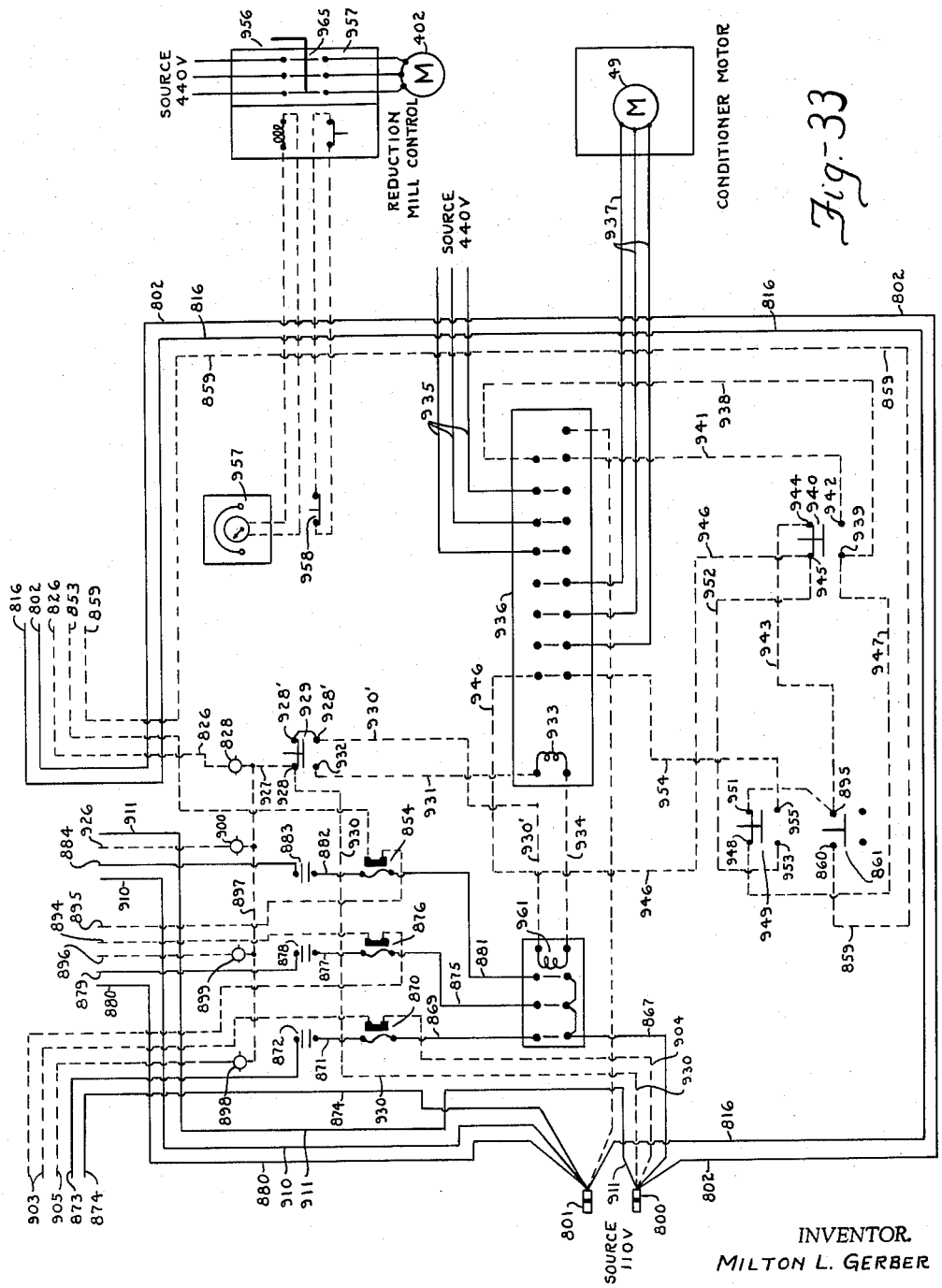

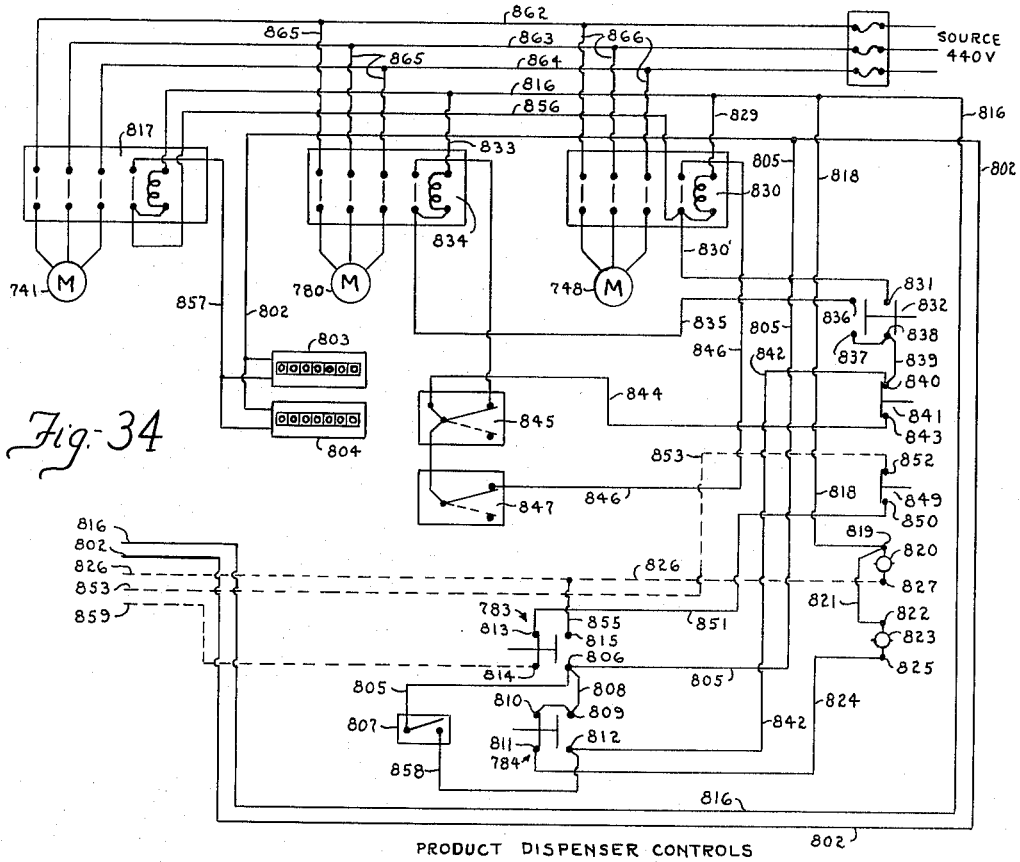

3,259,104
APPARATUS FOR MANUFACTURING A PRODUCT
Milton L. Gerber, R.R. 1, Craigville, Ind.
Filed Mar. 13, 1962, Ser. No. 179,426
22 Claims. (Cl. 118—8)

The subject invention relates generally to the manufacture of insulation and more particularly is directed to apparatus for the manufacture of insulation of the flowable type which is adapted to be blown or directed into buildings for insulating such components as walls and ceilings thereof.

One of the principal objects of the invention is to provide an apparatus whereby absorbent material, such as cellulose fibers, are subjected to chemicals and steam in a manner whereby the material absorbs or is impregnated by the chemicals to obtain a substantially fireproof and dustless insulation, as distinguished from at least the majority of conventional insulating materials of the flowable type which merely comprise a mass of fibers and granulated, pulverized or comminuted chemicals mixed together.

A significant object of the invention is to provide an apparatus or system which comprises conditioning or shredding an absorbent material, such as old newspapers, and conducting a layer of it on a conveyor, drying a plurality of chemicals, mixing the chemicals and dispensing the compound or mix onto the layer of conditioned material while it is being conveyed, simultaneously reducing the size of the material into small particles and mixing the compound therewith to provide a mass, circulating the mass through a chamber of an impregnator structure, subjecting the mass to steam and heat for a predetermined period of time to cause the compound to melt and be absorbed by the particles of the mass, through the pores of the fibers by capillary movement and then expelling the particle-mass for contact with the atmosphere to obtain a lightweight fluffy insulation which is highly resilient or fluffy, substantially fireproof, vermin proof, dustless and uniform in texture.

An important object of the invention is to provide a unique structure for automatically dispensing the mixture of chemicals onto the layer of conditioned or shredded material in proportion to the density, thickness or quantity of the material being conveyed. More particularly, an object is to continuously measure the thickness of the layer of material at a predetermined location throughout its travel and utilize such measuring to control the amount of compound to be dispensed or mixed with the material.

A particularly important object of the invention is to provide an apparatus or system comprising a plurality of subassemblies, structures or units embodying improved principles of design and construction and which are connected in synchronism to obtain a continuous operation.

A very significant objective of the invention is to provide a system with means which is responsive to the density, thickness or quantity of the material being conveyed for controlling the amount of a chemical or chemicals dispensed for mixture with the material and the amount of steam admitted to the chamber of the impregnator structure. The dispensing of the chemical or chemicals and admission or dispensing of the steam is in direct proportion to the density, thickness or quantity of the material being conveyed so as to obtain uniformity in the product.

Also, an object of the invention is to provide a system of controls for promoting proper flow of the materials and chemicals and interrupting their flow when certain abnormal conditions exist in the system.

Further objects of the invention reside in providing an organization of components or a setup which offers advantages with respect to operation, efficiency, safety, durability and uniformity in the resulting product.

Other objects and advantages of the invention will become apparent after the description hereinafter set forth is considered in conjunction with a preferred embodiment of the invention or inventions exemplified in the annexed drawings.

In the drawings:

FIGURE 1 is a schematic view of various assemblies or units comprising the system;

FIGURE 2 is a side elevational view of a horizontal conveyor structure and means for conditioning or shredding a material;

FIGURE 3 is a partial side elevational view showing a biasing or resilient means acting on a part of the conveyor structure;

FIGURE 4 is a side elevation view of the mechanism utilized to operate the conveyor structure and shredding means;

FIGURE 5 is a vertical section showing structural details of the conveyor structure and shredding means;

FIGURE 6 is a vertical section of an inclined belt conveyor structure with an agitator rotatably mounted thereon;

FIGURE 7 is an elevational view of a structure for mixing chemicals, with portions in section to show details, including a screw conveyor operatively associated with the structure;

FIGURE 8 is a top view of a mixer for the chemicals;

FIGURE 9 is a top view of the mixer, with its cover removed to depict certain internal structure of the mixer;

FIGURE 10 is a transverse section taken through an outlet conduit extending from the mixer;

FIGURE 15 is an elevational view of a portion of the chemical dispenser showing a part of a means for controlling and/or dispensing the chemical compound onto the condition material;

FIGURE 16 is an elevational view of a part of the dispenser showing a means assisting to level the compound;

FIGURE 17 is a partial top view, with portions in section, of an inclined belt conveyor structure having a control or gauge roller associated therewith which serves to pack and level the conditioned material and measure its density, thickness or quantity being conveyed whereby to regulate or control the flow of the chemical compound to the material;

FIGURE 18 is a vertical section taken through a mill structure for additionally conditioning or reducing the size of the material and mixing the latter and the compound;

FIGURE 19 is an elevational view, with portions in section, of the mill structure, including the impregnator structure whereby the conditioned material is impregnated with the chemical compound;

FIGURE 20 is another elevational view of the mill structure shown in FIGURE 19, with portions of the impregnator in section, to show structural details thereof;

FIGURE 21 is a transverse section taken through the impregnator structure showing other details thereof;

FIGURE 22 is a partial section of the internal structure of the impregnator, depicting a nozzle and its relation to a mounting and related components;

FIGURE 23 is a front view of one of the nozzles and its mounting;

FIGURE 33 is a diagram of a part of the wiring system directed to the master control panel carried by a mounting disposed adjacent the input end of the apparatus;

FIGURE 34 is a part of the wiring system directed to controls for the product dispenser structure;

FIGURE 35 is a part of the wiring system directed to controls for the chemical dispenser and impregnator; and FIGURE 36 is a part of the wiring system directed to controls for the inclined conveyor structure.

Figure 11:
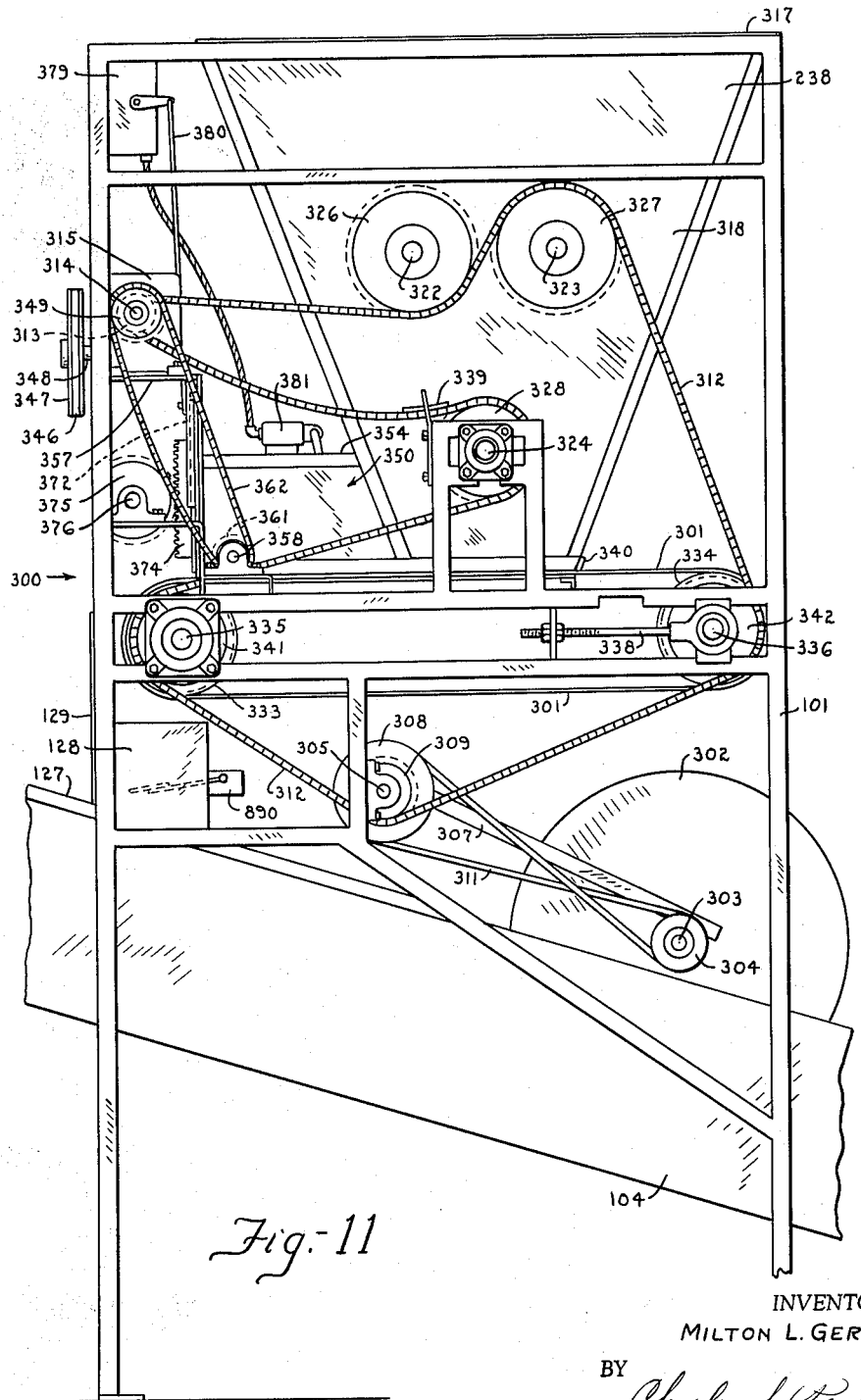
FIGURE 11 is an elevational view of one side of a dispenser structure for dispensing the mixed chemicals or compound.

Referring first to the schematic disclosure in FIGURE 1, the system shown may include a horizontal belt conveyor structure generally designated 1 for receiving absorbent material 2 which has been separated on a table 3 from a bale; a structure generally designated 4 for conditioning or shredding the material into pieces; an inclined belt conveyor structure designated 100 for conveying the conditioned or shredded material to a reduction mill or conditioner 400 where the size of the shredded material or pieces thereof are appreciably reduced to small particles; a drier 150 removing any excess moisture in relatively dry chemicals which are conveyed to a mixer 200 and thence to a dispenser 300 which deposits the chemical compound onto the pieces of material being conveyed by the inclined conveyor 100; an impregnator 500 which receives the mass discharged from the reduction mill 400 for dissolving the chemicals for absorption by the particles or fibers of the material; a boiler 600 for supplying steam to the impregnator; and a separator 650 through which the resultant product from the impregnator is conveyed to a product dispenser structure 700.

Any material suitable for the purpose may be utilized in the process but as disclosed herein a cellulose material, such as old newspapers, has proven advantageous. This material is usually received in bales or small bundles which are either manually placed upon the table or fed thereto for separation for distribution onto the conveyor 1.

*Belt conveyor and conditioner*

This conveyor structure, exemplified in FIGURES 1 through 6, is supported on a frame and includes a lower hroizontal elongate assembly having an endless belt 5 mounted on a pair of rollers 6 and 7 so that an upper portion thereof slides on a horizontal platform. The conveyor structure also includes a relatively short inclined assembly having a frame carrying a pair of rollers 9 and 10 which support an overhead endless belt 11. The frame of the inclined assembly is preferably pivotally connected at 12 to the upper ends of a pair of side links 13 having lower ends pivotally connected at 14 to the sides of the frame. It will be observed that the connections between the upper ends of the links and the inclined frame are located somewhat closer to the outermost roller 10 of this frame and that its innermost roller 9 is located directly above and in spaced relation to the innermost roller 6 supporting the lower belt.

The lower belt structure may be provided with a conventional adjusting device 15 for shifting its outermost roller 7 relative to its innermost roller for tightening and loosening the belt and the upper belt structure may be provided with a similar device 16 as clearly depicted in FIGURE 2.

The conditioner or shredder structure 4 is mounted on and/or in relation to the framework for the conveyor structure 1, and is provided with a first chamber 18 having an entrance opening 19 located adjacent the innermost rollers 6 and 9 of the conveyor assembly and also with a second and larger chamber 20 having a discharge opening 20' disposed over the inclined belt conveyor structure 100. The housing is further provided with an inner rectangular passage 21 communicatively connecting the chambers 18 and 20 and with a rigid plate 22 at the entrance opening 19 so that horizontal knives 23 of a rotatable knife assembly mounted in the first chamber will cut or shred the product as it flows through the entrance opening and over the plate and then direct the shredded material through the passage 21 into the second chamber 20 where it will fall through opening 20' onto a belt of the inclined conveyor structure.

The overhead belt assembly is pivotally mounted as stated above and its inner extremity is adapted for vertical movement by providing the framework or housing with a pair of vertical guides in the form of slots 24 which receive the ends of a shaft 25 carrying the roller 9. This shaft, as shown in FIGURE 3, is provided with a short arm 26 and a depending member 27 has its upper end connected to the arm. A helical spring 28 surrounds the lower extremity of the member 27 with its upper end bearing against a part of the framework and a lower end bearing against an adjustable fitting 29 on the member for varying the force of the spring to normally urge the inner extremity of the overhead belt unit downwardly to an extent limited by the shaft engaging the bottom of the guides so that the position of the peripheral surface of the roller 9 will be predetermined in relation to the peripheral surface of the lower roller 6 in a manner whereby the opposed surfaces of the belts will compress and/or stabilize the moving material to facilitate the cutting or shredding thereof.

As shown in FIGURES 2 and 4, the shaft 25 is provided with a gear 30 and a shaft 31 of the roller 6 is provided with a gear 32 and a sprocket 33. The knife assembly is mounted on a shaft 34 having pulleys 35 and 36 fixed thereon. A link 38 is connected to the shaft 31 and carries a shaft 38 having a gear 39 thereon which meshes with the gear 32, and a link 40 is connected to the shaft 25 and carries a shaft 41 having a gear 42 thereon which meshes with the gear 30. The shafts 38 and 41 are connected by a link 43 for maintaining the gears 39 and 42 in mesh. The framework is provided with a shaft 44 which carries an idler sprocket 45 and with a shaft 46 carrying sprocket 47 and pulley 48.

An electric motor 49 is preferably mounted on the framework and has a drive shaft 50 with a pulley 51 thereon which is connected by a belt 52 to the pulley 36 carried on the shaft 36 to drive the knife assembly. A belt 53 connects the pulley 35 on the knife assembly shaft 34 with the pulley 48 on the shaft 46 and a chain 54 is connected to the sprocket 47 on the shaft 46 and the sprocket 33 on the shaft of the roller 6 to drive the latter to impart motion to the lower conveyor belt 5 and rotation of shaft 46 will cause the gear 32 thereon to effect rotation of the shaft 9 and movement of the upper conveyor belt 11 through the agency of the gears 39 and 42 and the links 37, 40 and 43. It will be noted that the chain 54 engages the idler sprocket 45 for an obvious purpose. Thus, it will be apparent that the belts 5 and 11 and the knife assembly are all driven by the motor 49. It is to be understood that the components can be operated in different ways than those exemplified herein. The motor 49 constitutes a component of the electrical system and operates in unison with the inclined belt conveyor 100, the chemical dispenser 300, and impregnator 500 in accord with the electrical system illustrated in FIGURES 33 through 36.

Inclined belt conveyor

The inclined belt conveyor assembly 100, as illustrated in FIGURES 1, 2, 6, 11, 12, 17 and 20, is supported in relation to a frame 101 with its lower end disposed beneath the discharge opening 20 in the housing 17 of the conditioner 4 and its upper end has an offset inclined tubular formation 102 which communicatively connects with a similar formation extending from the reduction mill 400 to which the shredded material is fed. This conveyor is of sturdy construction and extends through the lower extremity of the frame 101 and may be partially supported thereby with its lower end bearing against a floor as shown in FIGURES 1 and 2. The conveyor may be supported in a horizontal position and includes an elongate trough having a bottom wall 103, side walls 104 and a lower end wall 105. As shown in FIGURES 6 and 20, shafts 106 and 107 are journalled in bearings on the side walls and respectively carry rollers 108 and 109. An endless belt 110 is carried by the rollers, with its upper portion slidably bearing on a rigid platform 111 in a conventional manner for receiving and carrying the material discharged from the shredder through the outlet 20. It will be observed that a lower portion of the housing 17 extends into the trough to locate the outlet therein. A pair of planar guides 112 extend upwardly from the side walls 104 of the trough and is straddling relation to side walls of the housing 17 adjacent the outlet to prevent overflow of the material from the trough. The guides 112 and/or bearings on the trough also serve to support the ends of a horizontal shaft 113 of a paddle wheel 114. The paddle wheel rotates in a clockwise direction as viewed and indicated by the arrow in FIGURE 6 and may comprise a mounting 115, square in cross-section, which is fixed on the shaft 113, a plurality of four inner rigid paddle sections 116 detachably connected to the mounting at right angles with respect to one another and four outer yieldable paddle sections 117 respectively detachably connected in overlapping relation to the inner sections to assist in yieldably urging and levelling the material on the belt. With this setup one or more of the paddle sections 116 and 117 can be replaced.

The paddle wheel shaft 113 is provided with a pulley 118, which is operatively connected by a belt 119 to a pulley 120 on the lower roller shaft 106 as shown in FIGURE 2. The belt about these pulleys may be readily adjusted by a conventional belt tightening device 121. The conveyor belt 110 is preferably driven by a motor 122 carried by the upper end of the trough as depicted in FIGURE 20. This motor is provided with a gear reducing mechanism having an output shaft 123 with a sprocket 124 thereon which is connected by a chain 125 to a sprocket 126 fixed on one end of the shaft 107 of the upper roller, so that the motor will impart motion to the belt 110 and the latter to the lower roller 108 to effect rotation of the paddle wheel through belt 119. This wheel may be rotated in a reverse direction when desired so as to unplug any compacted material in the lower end of the conveyor.

As clearly shown in FIGURES 11, 12, 13 and 17, an elongate cover 127 is mounted on the trough and provided with an upstanding tubular inlet formation 128 through which the mixed chemicals fall onto the shredded material being conveyed by the belt 110. It will be observed that this formation is provided with a wall extension 129 which may bear against the frame to locate and prevent the cover from sliding downwardly on the trough. The motor 122 constitutes a component of the circuitry and operates in unison with the conditioner 4, the chemical dispenser 300 and the impregnator 500.

Drier

The drier 150 for the chemicals, as depicted in FIGURE 1, has proven very useful and advantageous in conjunction with the system or process and is substantially conventional in construction. As illustrated in FIGURE 1, it may include a belt conveyor 151 on which the chemicals ride for subjection to heat for a predetermined period adapted to emanate from a plurality of overhead heating elements 152. The drier also includes a hood and blower 153 for discharging the heat and any moisture expelled from the chemicals. A screw type of conveyor 154 communicatively connects the mixer with a bin 155 provided on the mixer 300 for conveying the chemicals thereto. As further shown in FIGURE 1, numeral 156 represents comminuted or powdered aluminum sulphate $Al_2(SO_2)3.14H_2O$; and numeral 158 comminuted or powdered borax acid $H_2BO_3$. These chemicals are preferably introduced into the drier in the ratio of one part of aluminum sulphate, one part of borax and two parts of boric acid so that the compound or mixture has a proper balance of pH, flame spread and afterglow retarding qualities, and with no toxic effects when activated chemically. Of further significance is the fact that while all of the named chemicals have a fire retarding quality, the aluminum sulphate tends to neutralize the acidity of the boric acid and the boric acid also serves to preserve the material or product and render it insecticidal and rodenticidal in character.

The drier is preferably selectively operable but if desired the drier can be omitted, in which event the chemicals can be manually deposited in the bin of the mixer. The drier serves to condition the chemicals to a specific moisture content in equilibrium with a 30% relative humidity atmosphere or dried of hydroscopic moisture to a point where proper flow, proper mixing and eminent coverage of the particles or fibers during the final stage or stages of the processing is achieved.

Mixer

The mixer for the chemicals generally designated 200 and clearly shown in FIGURES 1 and 7 through 10 is substantially of conventional construction and mounted vertically in a frame 201. It is preferably in the form of a funnel shaped housing having an upper cylindrical portion 202, an intermediate conical portion 203 and a lower reduced cylindrical portion 204. An open ended cylindrical tube 205 is supported by braces 206 and 207 in spaced axial relation to the lower reduced cylindrical portion 204 to define an annular passage 208. The conical portion 203 is provided with a discharge opening 209 adjacent to the annular passage 208 and the reduced portion 204 is provided with the bin 155 as stated above.

A helical conveyor screw 210 is rotatably arranged in the cylindrical tube 205 and reduced cylindrical portion 204, with the lower end of its shaft suitably journalled and its upper end journalled in a bearing on a bar 211 extending diametrically across a top on the housing as depicted in FIGURES 7 and 8. The screw shaft is provided with a pulley 212 which is operatively connected by a belt 213 to a pulley 214 carried by a drive shaft 215 of an electric motor 216 mounted on the housing or frame 201. The screw shaft is also provided with a paddle 217 interposed between the bar and tube whereby to assist in dispersing and spreading the chemical mixture radially as it moves out of the tube to additionally promote the mixing action of the chemicals. Rotation of the screw 210 initially causes the chemicals to rise vertically in the reduced portion and the tube as well as upwardly through the annular passage 208 into the conical portion of the housing until the passage is closed, whereupon the mixture will rise primarily in the tube. The organization is such that there is a continuous intermixing of the incoming mixture with that which is already in the mixer and being mixed. When the mixture in the housing attains a predetermined height it will gradually fall downwardly through the discharge opening 209 into the lower end of an inclined screw conveyor tube generally designated 218 via a duct structure generally designated 219. The duct structure may include a conduit 220 fixed on the conical portion 203 of the housing, a conduit 221 fixed on the conveyor tube 218 at an acute angle thereto, and a union 222 detachably connected to the conduits by fasteners 223. The conduit 220 preferably is square in cross-section and the union is squared at one end for connection with this conduit and circular at its other end for connection with the conduit 221 which is circular in cross-section. The conduit 220 is preferably provided with a slide valve 224 whereby the flow of the mixture from the housing to the inclined screw conveyor can be manually controlled.

The inclined screw conveyor 218 communicatively connects the mixer 200 with the chemical dispenser 300 and comprises an elongate tube 225 with a helical screw 226 journalled thereon for rotation as depicted in FIGURES 1 and 7. The tube may be attached to the dispenser 300 by a fastener 227 and its lower end may be secured to a floor by a bracket 228 or to the frame 201. The tube is provided with a tubular conduit 229 disposed at an acute angle thereto and a closure 230 which receives and reinforces upper portions of the tube and conduit and supports a bearing 231 for the upper end of a shaft 232 of the screw including a resiliently mounted motor 233 having a shaft 234. This motor shaft carries a pulley 235 which is connected by a belt 236 to a pulley 237 on the shaft 232 for driving the screw to elevate the mixed chemicals upwardly through the conveyor tube so they may fall into the conduit 229 for discharge into a hopper 238 of the chemical dispenser 300. The lower end of the screw shaft is journalled in a bearing at the lower end of the tube. The motors 216 and 233 are each manually selectively operable.

*Chemical dispenser*

The chemical dispenser 300 illustrated in FIGURES 1 and 11 through 17 is unique in structure and operation and will now be described. This dispenser comprises, along other things, the box-like open vertical frame 101 and the overhead hopper 238 above referred to, a relatively short horizontal endless conveyor belt 301 for carrying the chemical mixture from the hopper onto a ribbon or layer of shredded material which has been at least partially compressed by a depresser preferably in the form of a gauging roller 302 located below the belt and fixed on a rotatable shaft 303 having a pulley 304 thereon. This roller serves to gauge or regulate the amount of chemical mixture to be dispensed as will be explained more in detail subsequently. The shaft 303 is mounted on an elongate carriage fixed on an oscillatable shaft 305 journalled in bearings on the frame 101 as evidenced in FIGURES 11 and 17. The carriage includes a pair of side rails 306 and 307 which are welded or otherwise secured to the shaft 305. A unit, comprising an idler pulley 308 and an idler sprocket 309, is rotatable on one end of the shaft 305 and a sprocket 310 is keyed to the opposite end of the shaft. A belt 311 connects the pulley 304 on the shaft 303 with the pulley 308 on the shaft 305 and a chain 312 is operatively connected to the sprocket 309 and a sprocket 313 on an output shaft 314 of a gear reducing unit 315 for actuating the roller 302 through the belt 311. A weight 316 is adjustably supported on a free end of the carriage rail 306 to counterbalance the roller 302 and sensitize its operation for gauging the thickness or density of the shredded or conditioned material on the conveyor belt 110.

Figure 12:
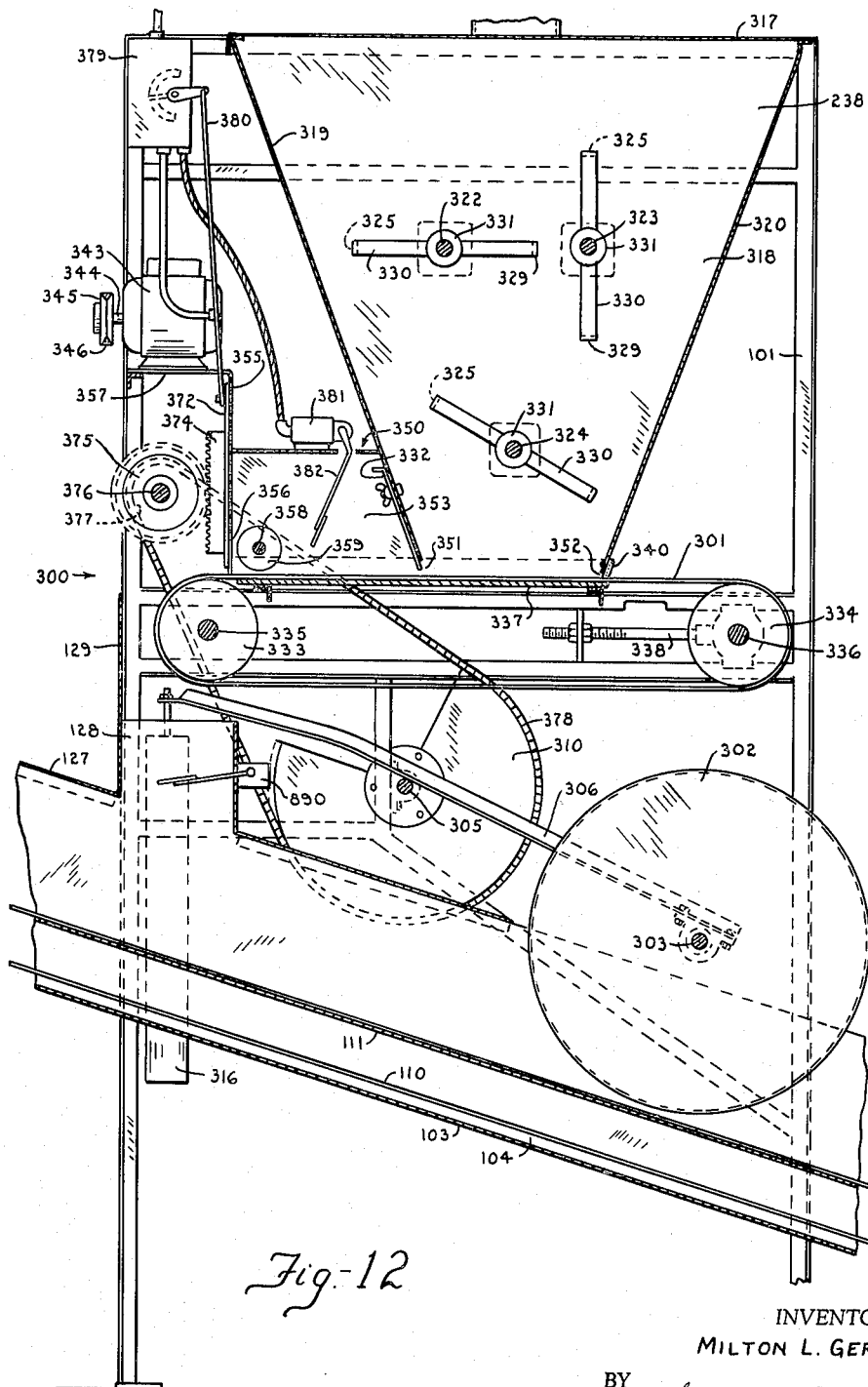
FIGURE 12 is a vertical section taken through the structure of FIGURE 11.

The hopper 238 includes a cover 317 through which the chemical mixture flows from the inclined screw conveyor extending from the mixer 200. The hopper also includes a pair of inclined side walls 318 and a pair of inclined end walls 319, and 320, all of which converge downwardly and define a squared discharge opening 321 over the endless belt 301. Three horizontal shafts 322, 323 and 324 are journalled in bearings carried by the side walls 318 of the hopper and/or frame. These shafts respectively carry generally rectangular agitating elements 325. The axis of the shafts are generally triangularly arranged as shown in FIGURE 12, with the upper two 322 and 323 horizontally disposed and the lower one 324 disposed substantially midway below the two and closer to the discharge opening 321. The motions of these shafts is synchronized so that the agitating elements overlap in operation to churn the chemicals but do not engage. The shafts extend through the side walls of the hopper and the upper shafts 322 and 323 respectively have sprockets 326 and 327 fixed thereon and the lower shaft 324 has an end supported in a bearing on an upright on the frame 101 and carries a sprocket 328.

Each of the agitator elements 325 preferably comprises an elongate horizontal portion 329 and offset vertical end portions 330, the latter being attached to longitudinally spaced hubs 331 fixed on each shaft.

It will be noted that the end wall 319 of the hopper is provided with an adjustable plate 332 for gauging the depth of the layer of chemicals on the conveyor as it leaves the hopper.

Figures 13, 14:
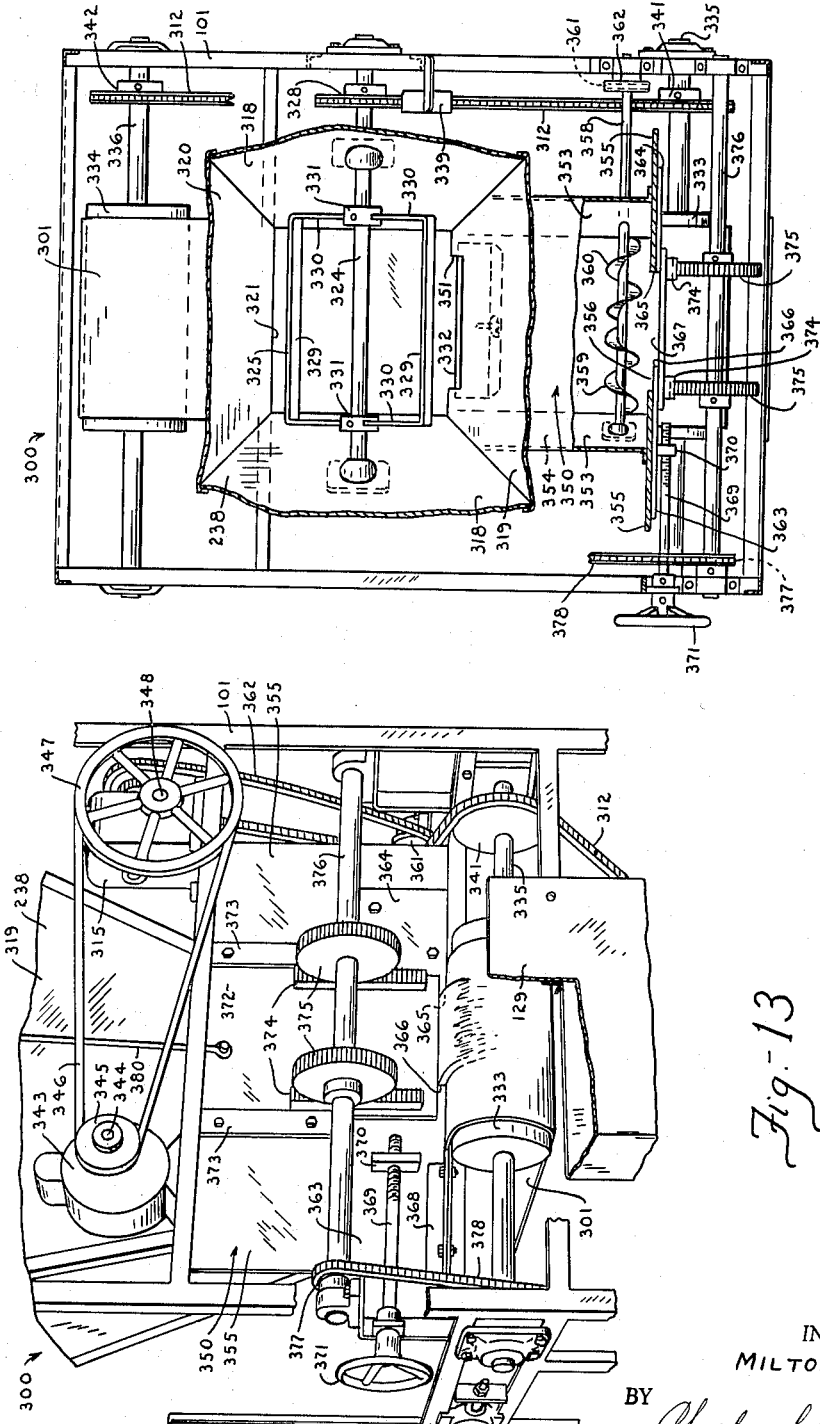
FIGURE 13 is a perspective view of a part of the chemical dispenser.
FIGURE 14 is a horizontal section taken through the chemical dispenser.

The belt conveyor structure includes the belt 301, above referred to, and a pair of rollers 333 and 334 supporting the belt and which are carried by a pair of shafts 335 and 336 journalled in bearings mounted on the frame. The upper portion of the belt is slidably supported on a rigid platform 337 in a conventional manner and an adjusting device 338 may be utilized to shift the shaft 336 to tighten or loosen the belt including the chain 312. As shown in FIGURES 11 and 14, an adjustable member 339 is employed to stabilize the chain. It will be observed that the end wall 320 of the hopper is provided with an adjustable wiper seal 340 for resiliently engaging the belt to prevent leakage of the chemicals from the hopper. Similar seals are adjustably secured to the sides of the hopper for the same purpose. One end of the roller shaft 335 carries a sprocket 341 and a sprocket 342 is similarly carried by one end of the other roller shaft 336.

As depicted in FIGURES 12 and 13, a motor 343 is carried by the frame 101 and has a shaft 344 provided with a pulley 345 which is connected by a belt 346 to a wheel 347 on shaft 348 extending from the gear reducing unit or box 315 for driving the output shaft 314 thereof which carries the drive sprocket 313 and extends between and in engagement with the upper sprockets 326 and 327 on the agitator shafts 322 and 323, the sprocket 328 on the lower shaft 324, with the sprockets 341 and 342 on the roller shafts 335 and 336, and sprocket 309 on the oscillatory shaft 305 for simultaneously imparting rotation to the agitators 325, conveyor belt 301 and depresser 302.

A box-like structure generally designated 350, as depicted in FIGURES 11, 12, 13 and 14, is associated with the hopper in covering relation to a portion of the belt 301 and adjacent an outlet opening 351 provided in the inclined end wall 319 of the hopper. This opening is preferably in the form of a notch and the adjustable plate 332 is operatively associated therewith. As will be observed in FIGURES 12 and 16, the width of the opening is less than the width of the belt 301 and that the belt extends through notches 352 provided in the end walls 319 and 320 of the hopper to assist in closing off the squared discharge opening 321 defined by the sloping walls of the hopper. The box structure includes converging side walls 353; a top wall 354 and a vertical end wall 355 having a notch therein defining an outlet opening 356 having a width somewhat less than the width of the belt 301. It will be noted that the inclined end wall 319 of the hopper constitutes what may be termed a common wall between the hopper and box. The vertical end wall 355 extends upwardly and laterally at 357 and supports the gear reducing unit 315 and motor 343 above referred to. As evidenced in FIGURES 11 and 14, a shaft 358 extends through the side walls 353 of the box, with one end being journalled on the frame and its opposite end in a bearing carried by one of the side walls. This shaft is provided with right and left screws 359 and 360 disposed within the confines of the box and in relatively close overhead relation to the upper portion of the conveyor belt 301 for engaging and directing the chemical mixture toward the center of the belt shortly after it is conveyed through the outlet opening 351 in the hopper. These screws assist in controlling the mixture and preventing the same from piling up on the belt. The shaft 358 is also provided with a sprocket 361 which is operatively connected by a chain 362 to the sprocket 349 on the output shaft 314 of the gear reducing unit for driving the shaft 358.

As depicted in FIGURES 13, 14 and 15, a pair of vertical plates 363 and 364 are positioned against the end wall 355 of the box. The plate 364 is adjustable to selected positions, so that for example a vertical inner edge 365 thereof may be located flush with a vertical margin defining a part of the outlet 356 and the other plate 363 is horizontally adjustable to an infinite number of positions relative to the plate 364 so that a vertical marginal inner edge 366 thereof may be moved toward or away from the edge 365 of the plate 364 to vary the size of an opening 367 by these edges defined. The movable plate 363 is slidably supported at a predetermined elevation between the end wall 355 of the box 350 and a member 368 so that its lower edge is disposed relatively close to the upper surface of the upper portion of the conveyor belt so as to control or determine the width of the ribbon of chemical mixture discharged between the plates and through the inlet formation 128 of the cover 127 for deposit on the shredded material being conveyed on the belt 111 of the inclined conveyor as shown in FIGURE 13. The movable plate 363 may be readily shifted by means of a threaded shaft 369 mounted on the frame for connection with a lug 370 on the plate. A hand wheel 371 carried by the shaft may be used to turn the shaft to the extent desired.

Means are also provided whereby the quantity or thickness of the chemical mixture being conveyed by the upper portion of the conveyor belt 301 and through the opening 367 may be automatically adjusted in accordance with or in response to the density, thickness or quantity of the shredded mass being conveyed. This means, among other things, includes a gate valve preferably in the form of a vertically movable plate 372 disposed between guide cleats 373 carried by the end wall 355 of the box and the pair of vertical plates 363 and 364 as shown in FIGURES 13 and 15. This plate valve or door 372 is provided with a pair of spaced vertical gear racks 374 which mesh with a pair of gears 375 fixed on a rotatable shaft 376 having ends journalled in bearings on the frame. This shaft is also provided with a gear 377 at one end which is operatively connected by a chain 378 to the sprocket 310 on the oscillatable shaft 305 carrying the gauge roller 302. It will be observed that the valve 372 is operatively connected to an electrical control 379 by an elongate link 380 and that a switch 381 responsive to a vane 382 is mounted on the box. The purpose and function of the control will be described subsequently. The vane 382 normally swings in the direction of the moving chemicals and it is held in a forward position thereby to maintain the system operative. When there is an insufficient quantity of chemicals to maintain the vane in the aforesaid forward position the vane will automatically retract and effect operation of the switch to render the system inoperative. In other words, the operation of the chemical dispenser structure may be considered as being dependent on the amount of chemical mixture in the box. If the chemical is fed uniformly as intended the dispenser will continue to function but it will become inoperative if there is an insufficient quantity of chemicals in the box. The switch also serves to control the operation of the conditioner 4, inclined conveyor 100 and the impregnator 500.

The gauge roller 302, as pointed out above, serves to roll against the shredded material on the inclined conveyor belt 311 and slightly compress the material into a relatively compact mass but the density, height or thickness of this mass varies to some extent because the flow of the shredded material to the inclined conveyor belt is not always uniform, so the gauge roller will rise and fall depending on the amount, thickness or density of the material laid on the belt. Since this roller is pivotally mounted for movement about the axis of shaft 305 and the shaft 303 supporting the roller is operatively connected to the shaft 376 carrying the gears 375 which engage the pair of racks 374 on the vertically movable valve plate 372, this plate is movable in response to the movement of the depresser to thus automatically measure or gauge the quantity of chemical mixture that is to be dispensed for overlay or mixture with the shredded material. The timing or periodicity of the various motions involved is such that a greater quantity of mixture will fall onto a denser or thicker mass of shredded material and a lesser amount onto a less dense or thinner mass of the material. In other words, the mixture is deposited according to the density of the material in order to efficiently dispense the chemical compound for mixture with the material preferably prior to being subjected to the action of the reduction mill or conditioner 400.

Attention is directed to the fact that the drive motor 343 constitutes a component of the electrical system and functions in unison with the conditioner 4, inclined conveyor 100, and the impregnator 500. The control 379 includes a potentiometer for controlling the quantity of steam injected into the impregnator, as will be described subsequently.

*Reduction Mill*

The reduction mill 400, as illustrated in FIGURES 18, 19 and 20, includes a housing 401 and a manually selectively operable motor 402 which are mounted on a platform 403. This mill receives the shredded material and chemical mixture from the inclined conveyor belt 110. More particularly, the mill includes the housing 401 having a lower box-like section 404 and an upper section 405 hingedly connected at 406 to the lower section to provide access to a conventional rotatable hammer assembly generally designated 407 mounted on a horizontal shaft 408 which is drivingly connected to the motor 402 through the agency of a coupling 409. The shaft extends outwardly from the housing and carries a fan 410 disposed in a casing 411, the latter being communicatively connected to a chamber 412 in the lower part of the housing through a generally C-shaped conduit 413. The chamber is formed by a bottom wall 414, upstanding walls 415 of the lower housing section 404 and a semi-cylindrical perforated partition of wall 416 fixed in this section. The fan is of a sufficient capacity to draw the material and compound into the mill, force it through the partition and then upwardly into and through the impregnator.

The hammer assembly is so mounted that when rotated at a high rate of speed a plurality of staggered hammers 417 will simultaneously mix and/or pound the chemical mixture and shredded material introduced thereto through a tubular inlet 418 on the upper housing section 405 from the inclined belt conveyor and then drive the mixture and material through the apertures 419 in the partition 416 into the chamber 412 from whence it is drawn upwardly through the C-shaped conduit 413 by the fan and then forced at a relatively high velocity out through a vertically disposed conduit extension 420 of the fan casing 411. It will be observed in FIGURE 18 that the inlet 418 on the upper housing section is disposed generally tangent to the periphery of the hammer assembly in order to promote the flow of the material and chemical mixture thereto and that a valve 421, responsive to fluid pressure, is mounted in the inlet to prevent back pressure and/or back flow of the material and mixture. The upper end of the extension 420 is preferably squared and detachably connected to a squared conduit 422, which in turn is joined tangentially to one side of a horizontal cylindrical drum 423 constituting a component of the impregnator assembly 500. It will be noted that conduit 413 is relatively wide at its base and tapers upwardly for communicative connection with the center of the fan housing in order to promote the flow of the material and mixture.

The conduit 422 is preferably tapered so that its upper end joining the drum at one end thereof is smaller in cross-section than at its lower end in order to increase the velocity of the material and mixture at its junction with the drum to promote or accelerate rotary movement of the material therein. A damper or valve 424 is pivotally mounted in the conduit 422 on a pivot rod 425. An adjustable means preferably in the form of a screw 426 and lock nut device 427 carried by the conduit and disposed transverse to the plane of the damper for adjusting its angular position in the conduit to control the rate of material flow therethrough. More specifically, the angular position of the damper may be varied relative to a wall of the conduit as shown in FIGURE 19 to effect what may be termed a jet action to the material in conjunction with that produced by the taper of the conduit., The conduit extension 420 and the conduit 422 constitute a continuous passage for the upward flow of the material and mixture from the mill to the impregnator.

Attention is directed to the important fact that the chemicals and material after being subjected to the reduction mill are in a relatively finely divided state or condition. The intent is to disintegrate or defiber the material and substantially return it back to its normal texture or fibrous condition. The particles or fibers, due to their structural characteristics, serve to facilitate adherence of the dry particles of the chemicals thereto, and this adherence, affinity or attraction of the chemicals to the material is augmented by static electricity created by the action of reducing the material and mixing the chemicals therewith. The particles of material contain a negative charge and the chemicals a positive charge and the tremendous motion imparted thereto by the mill accelerates the static condition.

*Impregnator and boiler*

The impregnator assembly 500, exemplified in FIGURES 19 through 23, includes the horizontal cylindrical drum, above referred to, and other components which will now be described. The drum provides a chamber and comprises a section 501 to which the conduit 422 is connected and a complementary section 502 pivotally connected at 503 to the section 501. The pivotal section can be locked in place by fasteners 504 of which one is shown in FIGURES 20 and 21. The section 501 is also provided with a conduit 505 extending vertically upwardly in tangential relation to the drum to promote release of the conditioned material from the impregantor. It is to be understood that the impregnator assembly could be supported in a vertical position under certain conditions.

A stationary tubular structure extends axially in the drum and includes three longitudinally extending pipes 506, 507 and 508 and three corresponding arcuate or curved sections 509. The pipes are spaced 120° apart, and extend through end walls 510 and 511 of the drum. These pipes within the confines of the drum are each provided with longitudinally spaced nozzles 512 for emanating steam. It will be noted that the pipes 507 and 508 are connected externally by a pipe 513 at the left end of the drum as viewed in FIGURE 20, that the pipes 506 and 507 are similarly connected externally by a pipe 514 at the right end of the drum and that the left end of the uppermost pipe 506 is capped.

Each of the curved sections 509, as depicted in FIGURES 21 and 22, has an inner edge portion which is preferably secured by welding 515 to an inner side of a pipe and an outer edge portion whihc is secured by welding 516 to an outer side of an adjacent pipe for extension therebeyond a predetermined distance, as indicated at 517, alongside the nozzles 512. The radii of the curved sections are disposed substantially concentric to the longitudinal axis of the tubular structure so as to assist in imparting a generally circular motion to the chemical mixture and material away from the tubular structure and toward the inner smooth cylindrical surface of the drum. A helical blade or member 518 is secured to and about the tubular structure in a manner whereby to assist in directing the material and mixture spirally about the tubular structure and through the drum. This member also serves to facilitate release of the conditioned material through the discharge conduit 505 at the opposite end of the drum. The tubular structure also assists in spreading or circulating the mixture in a manner to facilitate or promote impregnation or treatment by the jets of unsaturated steam. It will be observed that the inner edge of the helical member is sealed or tight against the tubular structure and that its outer edge is sealed or held relatively close to the inner periphery of the drum so that all of the material and mixture is subject to the steam and heat for a predetermined period during its travel in the drum.

Each of the nozzles preferably include a reduced externally threaded portion 519 which is threadedly connected with a pipe and an enlarged portion 520 having a cylindrical passage through which the steam is ejected with considerable force into the material and mixture. It will be observed that the axes of the nozzles are so located that the steam is ejected substantially tangentially of the tubular structure in order to assist in imparting a circular motion to the material about such structure. The organization is such that substantially all of the material while flowing through the drum is subjected to jets or sprays of steam from the nozzles for the purpose of dissolving the chemical mixture to effect their impregnation or absorption into the pores of the material. Otherwise expressed, the material which has been reduced in size to a substantially fibrous condition and the mixture which adheres to the fibers are directed into the drum to effect a union between the fibers or separate particles of the material and the chemicals. The chemicals constituting the mixture during the process melt or disintegrate and are no longer separate or visible as they are absorbed by and/or encase each fiber or particle of material to produce a light weight fluffy mass of separate particles which are substantially uniform in texture and fireproof.

As depicted in FIGURES 1, 19 and 20, the impregnator receives steam from the boiler 600 by a plurality of connecting pipes, including a pipe 521, constituting a line extending from the boiler to a manifold 522, the latter of which is directly connected to the lowermost pipe 508 in the drum. It will be observed that a switch 523 is interposed in one of the connecting pipes, with an electrically operated valve 524 in the pipe 521 and that a drain line 525 extends from the manifold for automatically releasing a quantity of condensation accumulating in the manifold through the agency of a valve 526.

The valve 524 is electrically operated by a modulating motor 527, the latter being operatively connected to the control 379 to regulate the quantity of steam entering the drum and in direct ratio to the quantity of shredded material being controlled by the depresser or gauge roller. The normal lag in the operation of the motor 527 allows for the distance between the gauge roller and the impregnator. A control relay 528 is operatively connected to the electric valve 524 and to a transformer or low voltage source 529 and the latter to motor 527 to control the valve 524. The relay 528 is also connected to the valve 526 automatically releasing condensate from the manifold when the impregnator becomes inoperative.

After the material has been impregnated it is forced out of the outlet conduit 505 to the separator 650 by a conduit 651. The separator may be mounted on the roof of a building where any air or excess moisture may escape to the atmosphere while allowing the finished product to fall downwardly into the packaging structure 700 from which it is fed in a unique manner to bags when desired.

The quantity of absorbent or cellular material constituting a component or ingredient of the mixture is preferably within a range of between 75% and 85%, the quantity of dry comminuted or pulverized aluminum sulphate preferably within a range of between 3.75% and 6.75%, the quantity of dry comminuted or pulverized borax preferably within a range of between 3.75% and 6.75%, and the quantity of dry comminuted or pulverized boric acid preferably within a range of between 7.70% and 12.5%. A mixture containing the foregoing elements, whether treated by steam or not, has proven most effective.

More particularly, it has been determined that insofar as coverage, thermal value, density and flame spread tests are concerned, a mixture of 81% of adsorbent cellular or fiber material, 4.75% of aluminum sulphate, 4.75% of borax and 9.50% of boric acid has proven very satisfactory as a product of insulation whether untreated or when treated by steam to impregnate the material of the chemicals.

Another mixture which is suitable as a treated or untreated product comprises 85% of material, 3.75% of aluminum sulphate, 3.75% of borax and 7.50% of boric acid.

An additional mixture found satisfactory as a treated or untreated product comprises 75% of material, 6.25% of aluminum sulphate, 6.25% of borax and 12.50% of boric acid, while an alternate satisfactory formula comprises 72% of the material, 13% of aluminum sulphate and 15% boric acid.

When any of the above mixtures flow or pass through the chamber of the impregnator, the time for any portion entering and leaving the chamber is approximately three (3) seconds but this time may be varied to some extent, depending on the character of the material, solubility of the chemicals. The flow of the material and chemical compound as a mass from the reduction mill 400 to the separator 650 is approximately at the rate of 3000 feet per minute. Some uncondensed steam flows along with the mass to the separator and may supplement or augment the impregnation process depending upon the length of the duct or conduit extending between the impregnator and separator. The quantity of steam is adjustable in response to the density of the mixture as described above and the steam pressure at the nozzles 512 is preferably within a range of between 3 to 10 p.s.i. but is generally maintained at 5 p.s.i. and the temperature of the steam is preferably held at 162° F.

The particles of absorbent or cellular material after being conditioned by the reduction mill 400 are usually of a slender size somewhere between ⅛ to ¼ inch in length and the cross-section dimension somewhere between .005 and .015 of an inch. It is to be understood that a smaller or larger range of sizes may be employed. The particles are hollow, tubular, cellular, or intersticed which facilitates entry of the dissolved chemicals. The material is comprised of separate particles and particles which are joined together.

As clearly exemplified in FIGURES 28, 29, 30 and 31 of the drawings, a particle or fiber has a wall structure 1000 with portions 156, 157 and 158 of the chemicals adhering thereto by reason of static attraction and/or by fuzz 1001 projecting from the wall. This particle or fiber and chemicals when subjected to steam will cause the chemicals to dissolve and diffuse into the cells or voids of the wall structure in various localized areas or regions which may be joined and/or separated from one another depending on the relative positions of the chemicals on the particles of material when subjected to steam. The cells, voids, pores, or interstices of the wall structure are fairly well filled by the chemicals. In some instances substantially all of the cells in a particle will be filled and in other instances ony a few may be filled. In other words, the amount of chemicals absorbed by each particle will vary to some extent, not only as to penetration but as to any overlay or deposit on the interior or external surfaces of the wall as illustrated. Also, in some instances, a particle will be substantially encased or surrounded by a deposit, layer or film of chemicals. It is desirable that the particles of material are not completely saturated with the chemicals and to this end the quantity of chemical compound admitted is less than that which would be required to obtain complete saturation or impregnation.

Figure 32:
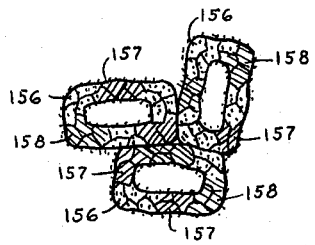
FIGURE 32 is a transverse section of a piece of material comprised of three particles or fibers.

In FIGURE 32 of the drawing there is shown a cross-section of three fibers or particles of the material that were not separated by the reduction mill 400. As pointed out above, the material introduced into the conditioner 4 is shredded or reduced into small pieces and these pieces are again reduced in size or disintegrated into smaller finely divided particles or pieces and each particle or piece may include one or more fibers.

A substantial penetration and coverage of the particles of material offers a greater value or advantage with respect to fireproofing the material or using it as a fire extinguishing agent or medium.

*Product dispenser*

Figure 24:
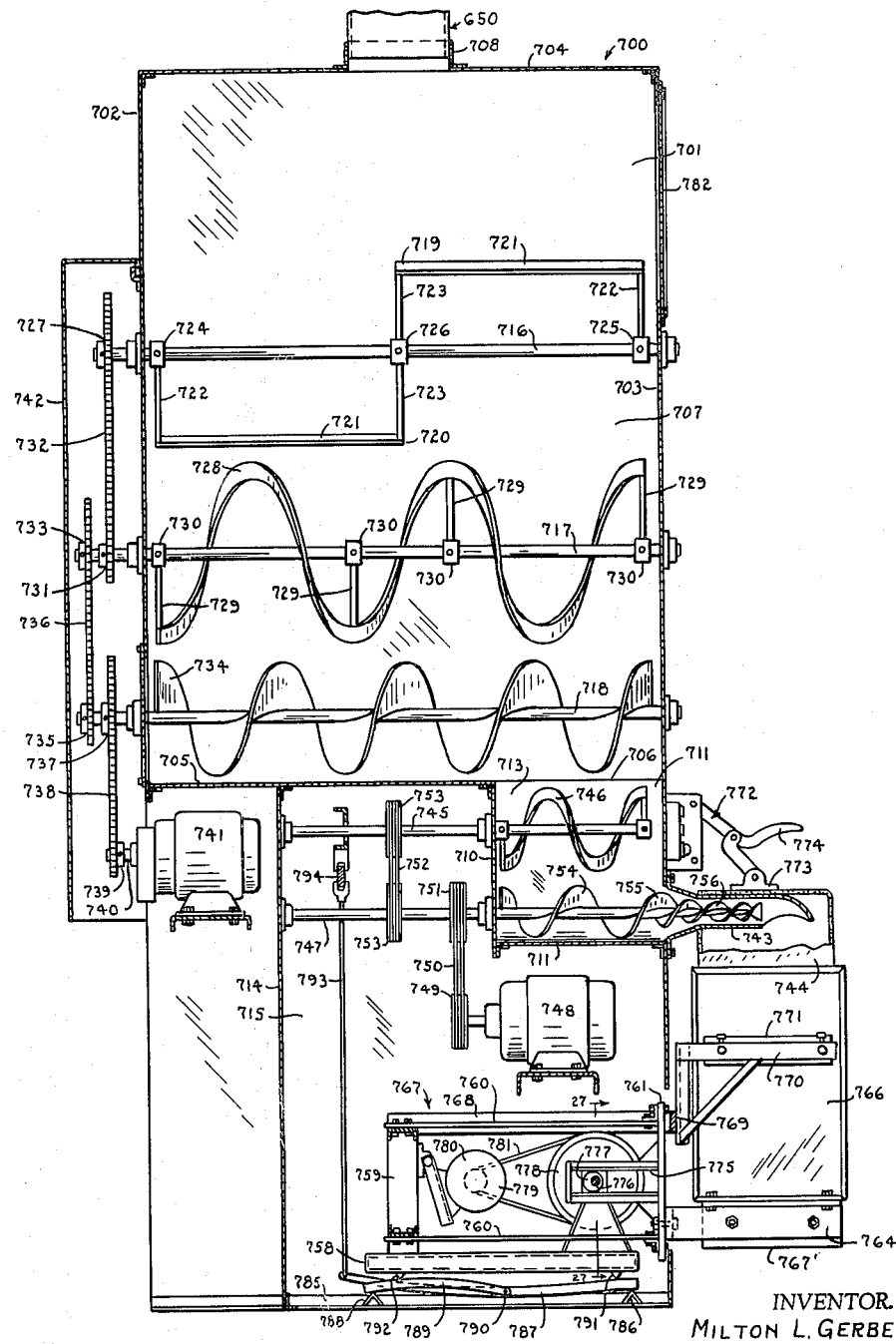
FIGURE 24 is a vertical side elevational view of the product dispenser structure.
Figure 25:
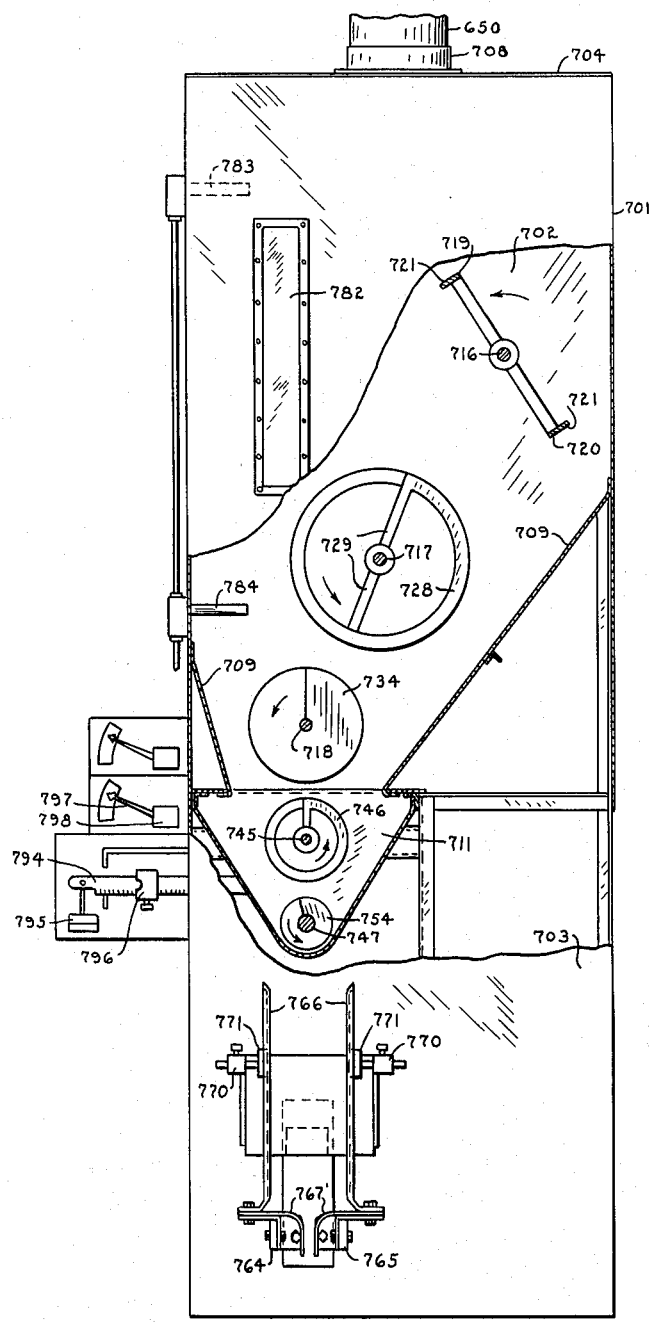
FIGURE 25 is a front elevational view of the dispenser structure showing particularly the means employed for driving the agitating means and/or screws disposed in a primary chamber or bin of the structure.
Figure 26:
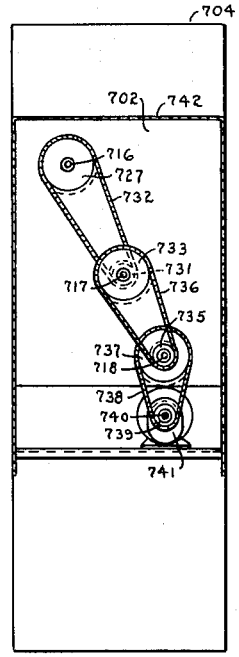
FIGURE 26 is a partial vertical section illustrating certain details of a means for vibrating or settling the finished product in a sack.
Figure 27:
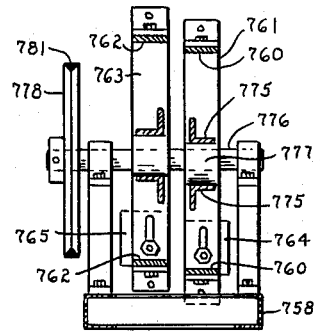
FIGURE 27 is a vertical section taken substantially on line 27—27 of FIGURE 24 disclosing details of the structure for settling the product in a sack.
Figure 28:
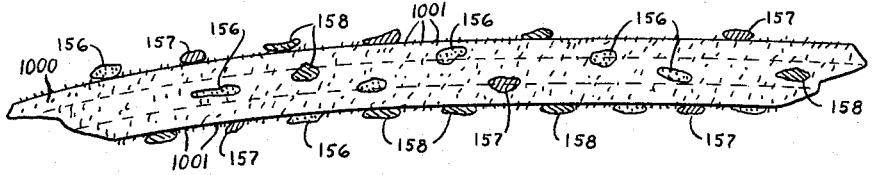
FIGURE 28 is an enlarged side view of a portion of a particle or fiber of material showing the dry chemicals adhering thereto.
Figure 29:
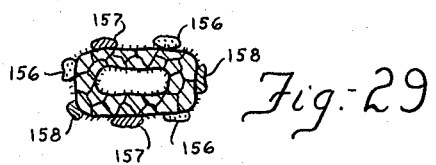
FIGURE 29 is a transverse section taken through the particle shown in FIGURE 28.
Figure 30:
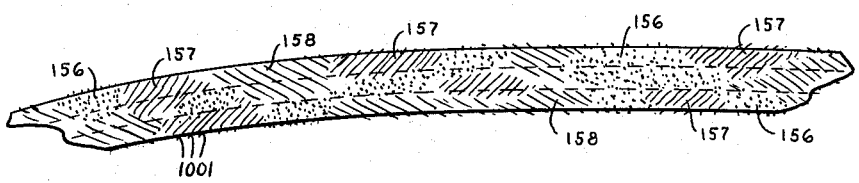
FIGURE 30 is a side view of the particle showing the manner in which the same is impregnated with the chemicals after being subjected or treated with steam.
Figure 31:
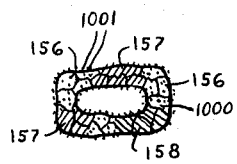
FIGURE 31 is a transverse section taken through the particle shown in FIGURE 30.

The product dispenser structure 700, illustrated in FIGURES 1, 24 and 25, is disposed substantially within the confines of a frame to which a plurality of panels or walls are attached to provide a cabinet. More particularly, there is shown in FIGURE 24 a pair of vertical parallel side walls 701, a rear vertical wall 702, a front vertical wall 703, a horizontal top wall 704 and a horizontal bottom wall 705 provided with an outlet opening 706. These walls define a relatively large or primary mixing chamber 707 which receives the conditioned product or material through a tubular inlet fitting 708 on the top wall. A pair of converging walls 709 form a part of the chamber 707. The lower end of the separator 650 is communicatively connected to the inlet fitting 708. A receptacle or box is formed about the outlet opening 706 and includes a short depending wall 710 disposed in spaced parallel relation to the front wall 703, a trough-like bottom wall 711 and a pair of converging side walls 712. The walls of the box define what may be termed a smaller or secondary chamber 713 connected to the primary mixing chamber through the outlet 706. A relatively long wall 714 depends from the bottom wall 705 of the chamber 707 in spaced parallel relation to the short depending wall 710 to define, in conjunction with the box and other walls, an enclosed space 715 for housing various operating components which will be described subsequently.

A plurality of shafts 716, 717 and 718 are disposed horizontally in the primary chamber 707 and have their ends journalled in bearings on the front and rear walls 703 and 702. The shaft 716 is located above the other shafts and carries an agitator structure for imparting a vertical tumbling motion to the product. This agitator structure comprises a pair of elements 719 and 720, each having a portion 721 disposed parallel to the shaft and vertical end portions 722 and 723. The ends 722 of the elements are respectively secured to hubs 724 and 725 and their aligned ends 723 to a center hub 726 to position the elements substantially diametrically on opposite sides of the shaft axis. The shaft 716 is provided with a large sprocket 727.

The shaft 717 is disposed intermediate the shafts 716 and 718 and to the left of shaft 716 as evidenced in FIGURE 25 and carries what may be termed a ribbon agitator. This agitator includes a spiral blade or member 728 which is secured in concentric spaced relation to the shaft by a plurality of rigid radially extending braces or supports 729 having their inner ends attached to hubs 730 fixed on the shaft. This agitator, as distinguished from the agitator structure thereabove, subjects the material to a screw-like or horizontal churning motion. The shaft 717 is also provided with a relatively small sprocket 731 which is operatively connected by a chain 732 to the sprocket 727 on the upper shaft 716. The shaft 717 also carries a large sprocket 733.

The shaft 718 is disposed below the intermediate shaft 717 and to the left thereof, as viewed in FIGURE 25, and carries a screw 734 which is formed to work and convey the conditioned material toward the outlet 706. The agitator 728 serves to move the material to the left for pickup by the left end of the screw 734 for conveyance by the latter toward the outlet as indicated by the arrows. This shaft is provided with a small sprocket 735 operatively connected by a chain 736 to the large sprocket 733 on the intermediate shaft 717. The shaft 718 also carries a large sprocket 737 operatively connected by a chain 738 to a small sprocket 739 on shaft 740 of an electric gear head motor 741. The relative sizes of the sprockets and connections therebetween afforded by the chains are such that the motor drives the lowermost shaft 718 at a higher rate of speed than the intermediate shaft 717 driven by the shaft 718, and that the uppermost shaft 716 is driven by the intermediate shaft at a lower rate than the latter. The various sprockets and chains are preferably protected by a cover 742 located at the rear of the dispenser structure.

Means are provided for agitating and expelling the conditioned material or product through a spout 743 extending outwardly from the receptacle and the cabinet for deposit in a bag 744 of the valved type. This means may include a shaft 745 journalled on the depending walls 710 and 714 and extends into the receptacle for supporting a ribbon-like agitator 746, similar to and of a size somewhat smaller than the actuator 728, above referred to. A shaft 747 is similarly journalled on the depending walls and extends into the receptacle as well as axially into the spout 743. A motor 748 is mounted in the space 715 and has a shaft provided with a pulley 749 which is operatively connected by a belt 750 to a pulley 751 on the shaft 747 for driving the latter. The shaft 747, in turn, drives the shaft 745 through a belt 752 operatively connecting pulleys 753 carried by these shafts. The shafts 745 and 747 are rotated at relatively high speeds, for example, speeds within a range of 1500 r.p.m. to 2500 r.p.m. have proven satisfactory.

Attention is directed to the important fact that the shaft 747 is provided with a unique form of a screw for conveying the product from the receptacle and through the spout. This screw comprises a relatively large portion 754 of substantially uniform diameter and pitch, an intermediate tapered portion 755 of variable pitch and a portion 756, smaller than portion 754, of a substantially uniform diameter and pitch. It is to be noted that the portions 754 and 755 are disposed substantially in the receptacle and that the portion 756, which is somewhat smaller than the portions 754 and 755, is disposed substantially in the spout 743. The screw shown is of the solid center type and has proven satisfactory but if desired, it may be the continuous twist type. This screw affords a positive and forceful uniform flow of the product into the bag 744.

Means, as depicted in FIGURES 1, 24, 25 and 27, are provided for agitating and weighing the finished product and these will now be described. The agitating means preferably includes a horizontal rigid frame generally designated 757 having a base 758 provided with a vertical upright structure 759. A movable unit comprising a first pair of horizontal leaf springs 760 have their inner ends secured to the upright structure 759 and their outer ends are attached to a vertical member 761. A similar movable unit comprising a second pair of horizontal leaf springs 762 are similarly secured to the upright structure 759 and to a vertical member 763. Horizontal supports 764 and 765 are respectively adjustably secured to the lower ends of the vertical members 761 and 763. The members 761 and 763 are each slotted for respectively receiving fastening means extending through the slots into the supports so that the structure will accommodate bags of various sizes. A pair of vertical walls 766 are respectively secured to the vertical members 761 and 763 and each sack to be filled is adapted for disposition on the supports 764 and 765 between the walls 766. A pair of spaced guides 755 are also respectively carried by the supports for receiving therebetween the lower end portion of an empty sack and as the sack is filled it expands against the walls 766 for shaping and pulls the end portion upwardly and/or onto upper portions of the guides and/or supports. The frame 757 includes a pair of rigid horizontal members 768 and a crossbar 769. A brace device is secured to the crossbar and includes a pair of outwardly extending arms 770 respectively provided with a pair of adjustable shoes 771 which are slidably engaged by the vertical shaping walls 766. A clamping device 772 is properly supported above the spout 743 and has a clamping element 773, operable by a handle 774, for clamping an upper portion of the sack against the spout for holding the sack in position for filling.

The vertical members 761 and 763 of the movable units are respectively provided with horizontal guideways 775 disposed between the pairs of springs 760 and 762. A horizontal shaft 776 is mounted from the rigid platform or frame 757 and carries a pair of eccentrics 777 which are respectively arranged in the guideways 775. A pulley 778 is also carried by the shaft 776 and a motor 779 also carried by the frame has a shaft with a pulley 780 thereon which is operatively connected to the pulley 778 by a belt 781 for driving the shaft 776 to cause the eccentrics to ride in the guideways and cause flexing of the springs and rapid vertical or up and down counterbalancing movements of the units to impart vibration to the sack and thereby effect efficient settling of the product therein as it is forced into the sack.

As depicted in FIGURES 24 and 25 the cabinet for housing the dispenser 700 is provided with a window 782 in the front wall 703 so that an operator may view the quantity and motion of the material in the chamber 707. Also depicted in FIGURE 25 is a pair of micro switches 783 and 784 for controlling or determining the amount of material in the chamber. When the material in the chamber reaches the height of the upper switch 783 the pressure of the material will actuate the switch to stop the entire system and prevent flow of material to the dispenser 700 and when the material falls to the level of the lower switch 784 the dispenser only will also be rendered inoperative and leave sufficient material in the chamber to provide a seal and prevent blowing of a bag connected with the spout.

The weighing structure includes a platform 785 provided with a fulcrum 786 supporting one end of a beam 787 on which the rigid frame 767 is mounted. The platform is also provided with a fulcrum 788 and a lever 789 has one end pivoted at 790 to the beam at a location intermediate its length and its other end engages the fulcrum 788. The base 758 of the rigid frame has an abutment 791 engaging the beam at a location between the fulcrums 786 and 788 and also has an abutment 792 engaging the lever at a location between its ends, so that tilting movement of the frame relative to the fulcrum 786 will actuate a rod 793 connected to a graduated arm 794 of a scale.

17

The arm extends outwardly from the cabinet as depicted in FIGURE 25 and by the use of the weights 795 and an adjuster 796, the sacks can be filled to any weight desired. More specifically, when the weight reaches a predetermined value as shown by a pointer 797 a switch 798 is operated to render the motors 741 and 748 inoperative so that the ribbon agitator and screw in the receptacle chamber 711 will stop the flow of material to a sack.

*Circuitry*

Referring to the schematic circuitry exemplified in FIGURES 33, 34, 35 and 36 of the drawing there is disclosed a pair of input terminals 800 and 801 adapted for connection with a source of electrical energy, preferably 110 volts. A conductor 802 extends from the terminal 800 to a master counter 803 and a day counter 804. A conductor 805 is joined to the conductor 802 and connects with a contact 806 of the upper micro switch 783 in the chamber 807 of the product dispenser 700 and to an override switch 807. A conductor 808 extends from conductor 805 and/or contact 806 to a pair of joined contacts 809 and 810 of the lower micro switch 784. The switch 784 is also provided with additional separate contacts 811 and 812 and the switch 783 with additional contacts 813, 814 and 815.

A conductor 816 extends from the terminal 801 to a relay 817 and a conductor 818 is joined to the conductor 816 and to a contact 819 of a pilot light 820 and a conductor 821 joins the contact 819 with a contact 822 of a pilot light 823. A conductor 824 joins a contact 825 of the pilot light 823 with the contact 811 of the lower micro switch 784. A conductor 826 joins a contact 827 of the pilot light 820 with a terminal of a pilot light 828.

A conductor 829 joins the conductor 816 with a relay 830 and the latter is connected by a conductor 830' to a contact 831 of a manually operable start switch 832 and another conductor 833 joins the conductor 816 with a relay 834. A conductor 835 connects the relay 834 with a contact 836 of the switch 832, the latter also having a pair of joined contacts 837 and 838. The contact 838 of the switch 832 is joined by a conductor 839 to contact 840 of a manually operable stop switch 841 and a conductor 842 joins the contact 840 and the contact 812 of the switch 784. Another contact 843 of the stop switch 841 is connected by a conductor 844 to an auxiliary weight switch 845. A conductor 846 connects the relay 830 with a weight switch 847 and the switches 845 and 847 are connected by a conductor 848.

Another manually operable stop switch 849 is provided and has a pair of separate contacts 850 and 852. The contact 813 of the micro switch 783 is connected by a conductor 851 to the contact 850 of the switch 849 and the contact 852 of this switch is joined by a conductor 853 to an overload relay 854. A conductor 855 joins the conductor 826 with the contact 815 of the upper micro switch 783; a conductor 856 joins the relays 817 and 830; and a conductor 857 is connected to the counters 803 and 804. A conductor 858 joins the override switch 807 with the contact 812 of the lower micro switch 784 and a conductor 859 connects the contact 814 of the upper micro switch 783 with a contact 860 with a master stop switch 861.

A source of electricity, preferably of 440 volts, three phase, is utilized to energize the motors 741 and 748 which agitate and convey the material in the product dispenser 700 and the motor 780 which rocks or oscillates the movable units which effect settling of the material in a sack. More specifically, three main conductors 862, 863 and 864 are connected to the motor 741, and three leads 865 from the main conductors are connected to the motor 780 and three leads 866 connect with the motor 741.

A conductor 867 is connected to the terminal 800 and to a relay 868; a conductor 869 connects this relay with an overload relay 870; a conductor 871 connects this relay with a manual switch 872; and a conductor 873 connects this switch with the motor 122 which operates the belt of the inclined conveyor 100. A conductor 874 connects the other terminal 801 with the motor 122.

A conductor 875 connects the relay 868 with an overload relay 876; a conductor 877 connects this relay with a manual switch 878; and a conductor 879 connects this switch with the motor 343 of the chemical dispenser 300. Another conductor 880 connects the other terminal 801 with the motor 343.

A conductor 881 connects the relay 868 with the overload relay 854, above referred to; a conductor 882 connects this relay with a manual switch 883; and a conductor 884 connects this switch with a relay 885.

The motor 343 of the chemical dispenser 300 is connected by a conductor 886 to a contact 887 of the vane operated switch 381 and a conductor 888 connects this contact with a contact 889 of another vane operated switch 890 carried by the inclined conveyor. The switch 381 is provided with three additional contacts 891, 892 and 893. The contact 891 is connected by a conductor 894 to the overload relay 876, the contact 892 to the overload relay 854 by a conductor 895 and a conductor 896 extends from the contact 893 to a pilot light 899. A conductor 897 is joined to a conductor 927 and in turn is connected to the pilot light 828, above referred to, including pilot lights 898, 899 and 900. A conductor 901 connects a contact 902 of the switch 890 with the conductor 896.

The overload relay 876 is also connected to the relay 870 by a conductor 903 and the relay 870 to the input terminal 800 by a conductor 904 and a conductor 905 connects the pilot light 898 with a contact 906 of a flow switch 907 which is mounted on the inclined conveyor and adjacent to the mill. A conductive 908 connects the motor 122 with a contact 909 of the switch 907.

A conductor 910 connects the input terminal 801 with the relay 885, above referred to, and a conductor 911 connects the other input terminal 800 with a contact 912 of a switch 913, the latter being operable by the relay. Conductors 914 and 915, respectively, connect the conductors 910 and 911 to the transformer 529 on the impregnator structure 500. The transformer is connected by a conductor 916 to the solenoid operated drain valve 526 and the solenoid by a conductor 917 to a contact 918 of the switch 913. The motorized valve 527 is connected to the transformer 529 by conductors 919 and a pair of conductors 920 connect the motor of this valve with the potentiometer 379. A conductor 921 also connects the motor operated valve 527 with a contact 922 of the switch 913 and a conductor 923 connects a contact 924 of the switch with the potentiometer.

A conductor 925 connects the relay 885 and conductor 910 with the switch 523 and the latter is connected by a conductor 926 to the pilot light 900. The pilot light 828 is connected by a conductor 927 to a contact 928 of a selector switch 929 and this contact is connected to the input terminal 800 by a conductor 930. A pair of joined contacts 928' of the switch 929 are connected by a conductor 930 to the relay 868 and a conductor 931 connects another contact 932 of this switch with a solenoid 933 and the latter is connected to the relay 868 by a conductor 934.

Three main conductors 935 of a 440 voltage source, three phase, are connected to a starter 936 and three conductors 937 connect this starter with the motor 49 which operates the shredder or conditioner 4. A conductor 937 is connected to the starter and terminal 801. The starter is operated by the solenoid 933.

A conductor 938 connects the starter with a contact 939 of a reversible switch 940 and another conductor 941 connects the starter with a contact 942 of this switch. A conductor 943 connects a contact 944 of the switch 940 with a contact 945 of the master stop switch 861, above referred to, and a conductor 946 connects the starter with a contact 945 of the switch 940. Another conductor 947 connects the switch 940 with the contact 948 of a master start switch 949, a conductor 950 connects the contact 945 of the master switch 861 to a contact 951 of the switch 949, a conductor 952 connects contact 945 of the reversible switch 940 with a contact 953 of start switch 949, and a conductor 954 connects the starter 936 with a contact 955 of the start switch.

A separate manual operable electrical control is utilized to operate the reduction mill motor 402. This motor is operatively connected to a transformer 956 and an ampere meter 957 with stop switches 958 and 959 for stopping the motor. A manually operable switch 965 is used to start the motor 402.

In view of the foregoing described circuitry it should be manifest that insofar as the product dispensing structure is concerned, the arrangement offers a setup whereby the normally open upper micro switch 783 in the chamber 707 of the cabinet will be closed when the material in the chamber reaches a height to actuate this switch which completely shuts down the operation of the interconnected assemblies of the system and energizes the pilot light 820 and also a pilot light 828 on a control mounting 960 disposed at convenient locations relative to the conveyor 1 and condtioner 4 as shown in FIGURE 1. These lights serve to give a visible indication at two remote locations of the condition of the material in the chamber and so that if desired other separate manual operative electrical components can be shut down. Obviously, if desired, audible signals in lieu of the aforesaid lights and the other pilot lights, above referred to, may be utilized. The pilot light 823 is operated when the lower micro switch 784 registers when the bin is empty.

The lower micro switch 784 in the chamber 707 of the bin of the dispenser is operative from a normally open position to a closed position when sufficient material has accumulated in the bin to commence filling bags. This switch also serves to prevent operation of the dispenser or bagger when there is no material in the bin.

When the start switch 832 is manually actuated the motor 741 operates to simultaneously rotate the three agitators or screws in the bin chamber 707 and also operate the motor 780 which rocks the structure for settling the material in the sacks. This switch also simultaneously operates the motor 748 which controls the flow of the product to the spout. When the weight of a bag being filled approaches a predetermined weight or value, the switch 845 automatically stops the motor 780 and when the correct weight is achieved the scale switch 847 stops the motors 741 and 748 to prevent flow of the material. If desired, the switch 841 can be manually actuated to completely stop operation of the dispenser. The organization is such that each time the motor 741 is operated, the counters 803 and 804 are energized to electrically record or count the number of bags filled.

The overload relay 854 is connected to the master stop switch 861 having normally open contacts. Prior to starting the manufacturing operation, the reduction mill 400 is manually started. All of the other productive operations are initially begun by actuating the master start switch 949 carried by the control mounting 960. When the switch 949 is actuated, the motor 49 is operated to rotate the knife assembly of the conditioner 4. Actuation of the motor starter switch also effects energization of a relay 961, associated with the starter 868, when the selector switch 929 is in the automatic position. The relay 961 is operatively connected to the overload relay 854 through the switch 883 and to the control relay 885, carried by a panel on the impregnator 500. The control relay 961 connects with the overload relay 876 through the switch 878 connected with the motor 343 on the chemical dispenser. The relay 961 is also connected to the overload relay 870 through the switch 872 to the motor 122 of the inclined conveyor 100.

When the selector switch 928 is set to a manually actuable position, as distinguished from an automatic setting, all of the functions of the control relay 961, above referred to, can be individually operated. The pilot light 900 is actuated by the steam pressure switch 523 adjacent the impregnator 500 when an insufficient supply of steam is available for proper operation of the impregnator and the pilot light 899 is actuated by the switches 381 and 890 which are disposed on the chemical dispenser 300 when the quantity of chemicals in the hopper is insufficient for proper operation or when no chemicals flow against the vane 382 of the switch 381. The pilot light 898 is actuated by the switch 907 when there is an overflow of material to the reduction mill 400.

The complete manufacturing process can be stopped by manually actuating the master stop switch 861 or by manually actuating the stop switch 849 on the bagger control panel, or can be automatically stopped when the upper micro switch 783 in the bin chamber 707 of the dispenser 700 is acuated resulting from an excess accumulation of material in the bin or by actuation of the switch 381 operated by the vane when there is an insufficient quantity of chemicals available for deposit on the layer of shredded material being conveyed by the horizontal belt 301 of the chemical dispenser. When the reversible switch 940 is manually actuated the motor 49 of the conditioner 4 can be reversed to unplug any packed material, in which event, the remainder of the process of manufacturing will be stopped.

The ampere meter 957 on a panel carried by the mill or adjacent thereto is utilized by the operators of the equipment to control the power load to the motor 402 of the reduction mill. This mill can be stopped by manually actuating the stop switch 958 or by manually actuating the stop switch 959.

When the master starter switch 949 is manually actuated the relay 885 disconnects the source of power to the solenoid operated bleeder valve 526 leading to a drain. The relay 885 also simultaneously operates the modulating motor 527 which is powered by the transformer 529, the motor being operable through the potentiometer 379. The potentiometer is operated by the rod 380, the latter being connected to the dispenser or gauge wheel 302 for directly controlling the quantity of steam entering the impregnator drum through steam valve 524 operated by the modulating motor 527.

Summarizing the above circuitry and elucidating further as to the operative relationship of the various assemblies of the system, the master start switch 949 serves to simultaneously operate the motor 49 of the conditioner 4, motor 122 of the inclined conveyor 100, motor 343 of the chemical dispenser 300, the solenoid of bleeder valve 526 and motor 527 of the valve 524. The master stop switch 861 serves to stop or render inoperative all of the assemblies, above referred to, which are set in motion by the master start switch 949.

The reversible switch 940 serves to stop the operation of all of the assemblies initiated by operating the master stop switch 861 and reverse the rotation of the motor 49 of the conditioner 4 so that any excess material accumulating in the lower end of the inclined conveyor can be unplugged by reversely rotating the paddle wheel 114.

A stop switch 958 serves to stop operation of the motor 402 of the reduction mill 400.

Attention is directed to the fact that the master start and stop switches 949 and 861, reversible switch 940 and the stop switch 958 are preferably mounted on the control mounting 960.

The stop switch 907 is preferably mounted on or adjacent the inclined conveyor and serves to stop the operation of all of the assemblies stopped by the master stop switch 861.

The chemical feeder switch 381, the flow switch 890 and the potentiometer 379 are preferably mounted on or disposed adjacent the chemical dispenser 300. The switch 381 serves to stop all of the assemblies stopped by the master stop switch 861 and stop switch 907. The switch 890 serves to illuminate the pilot light 899 when there is no flow of the chemicals into the formation. The potentiometer controls the motor of valve 527 on the impregnator 500 to modulate the flow of steam to the drum and operate the motor 343.

The steam pressure switch 523 is preferably mounted on or adjacent to the impregnator 500 and operates the pilot 900 when there is insufficient steam pressure.

The product dispenser 700 is provided with a plurality of selectively manually operable switches, and automatic switches which are preferably carried by or mounted adjacent the dispenser. More specifically, there is provided the manually operable start switch 832 which serves to simultaneously operate the motors 741, 748 and 780; the manual stop switch 841 which serves to stop the motors 741, 748 and 780; the manual stop switch 849 which serves to stop all of the assemblies that can be stopped by the master stop switch 861, and by the switches 907 and 381; and the manual override switch 807 which serves to stop the function of switch 784 so that the motors 741, 748 and 780 can be operated to completely empty the chambers 707 and 713 of the dispenser.

The switches 845, 847 and 874 are of the automatic type and carried by the dispenser. The switch 845 serves to stop the motor 780 as the bag approaches a filled condition and the switch 847 is operable by the weight of the bag and when the bag is filled to a predetermined weight or value determined by the scale, the motors 741 and 748 are stopped. The switch 783 serves to stop operation of all of the assemblies stopped by the master stop switch 861 and by the switches 907, 381 and 849 and the switch 784 serves to stop operation of the motors 741, 748 and 780.

In the view of the foregoing it will be manifest that the disclosure, among other things, illustrates an apparatus for manufacturing a product, the apparatus comprising means for reducing the size of an absorbent material into pieces, means for receiving and conveying the pieces in a layer in a predetermined direction, means for dispensing a dry chemical onto the layer while it is being conveyed, means for receiving and reducing the size of the pieces into particles and mixing the chemical therewith to form a mass, means for receiving the mass and directing the mass therethrough, and means for ejecting steam into said receiving means while the mass is directed therethrough to dissolve said chemical for absorption by said particles.

It is to be understood that insofar as the scope of the subject invention is concerned, when material for impregnation is obtained in particle-mass form without being subjected to a reduction mill, this material and the compound can be mixed for direct entry into the impregnator.

It is also understood, as alluded to above, that the dry mixture of absorbent or cellular material and the chemicals also provides a fireproof product which can be used as insulation without dissolving the chemicals for absorption or penetration into the material.

The insulation produced by the above described apparatus and/or process has proven very efficient in actual use and in addition to its fireproof qualities it offers advantages of a fire extinguishing medium for smothering a fire, without materially damaging a burning structure.

Having thus described my invention, it is obvious that various modifications may be made in the same without departing from the spirit of the invention, and, therefore, I do not wish to be understood as limiting myself to the exact forms, constructions, arrangements, and combinations of parts herein shown and described.

I claim:
1. An assembly for conditioning a mass of particles of cellular material and a chemical, said assembly comprising a stationary housing forming a chamber through which the mass and chemical are conducted, an elongate tubular stationary structure disposed axially in said chamber and provided with nozzles whereby steam can be ejected outwardly with reference to the longitudinal axis of said elongate structure into said chamber, said housing and said tubular structure defining a cylindrical passage, means for conveying a mass of material and a chemical into said chamber, and through said passage about said elongate structure, stationary means disposed in said passage for directing the material and chemical spirally through said passage, and means for controlling the admission of steam into said chamber to dissolve the chemical for absorption by the particles.

2. An assembly for conditioning a mass of particles of absorbent material and a chemical, said assembly comprising a housing forming a chamber through which the mass and chemical are conducted, an elongate structure centrally disposed in said chamber, nozzle means associated with said elongate structure, means whereby steam can be ejected through said nozzle means outwardly with reference to the longitudinal axis of said elongate structure into said chamber, means for conveying a mass of material and a chemical into said chamber and generally spirally about said elongate structure, and means for automatically controlling the admission of steam into said chamber in a direct proportion to the amount of the mass of material flowing through the chamber to dissolve the chemical for substantial absorption by the particles.

3. An assembly for conditioning a mass of particles of absorbent material and a chemical, said assembly comprising an elongate cylindrical housing through which a mass and chemical can be conducted, an elongate stationary tubular structure disposed in said housing in concentric spaced relation thereto to define an annular chamber, nozzles associated with said elongate structure, means carried by said elongate structure assisting to deflect the material and chemical away from said nozzles, means whereby steam can be ejected through said nozzles into said chamber, means for conveying a mass of material and a chemical to said chamber, means disposed in said chamber for causing a mass of material and chemical to flow in a generally spiral path about said tubular structure, and means for controlling the admission of steam into said chamber to dissolve the chemical for substantial absorption by the majority of particles.

4. Apparatus for mixing a dry chemical with a loose mass of pieces of absorbent material in direct proportion to the density of the material, means for reducing the size of the pieces into particles and mixing the latter with the chemical, means for receiving the particles and chemical and directing them in a generally spiral path therethrough, and means for ejecting steam outwardly with reference to the axis of the path and into said receiving means in direct proportion to the density of the material to dissolve the chemical for complete absorption by the particles.

5. Apparatus for conditioning a mass comprising pieces of absorbent material and a dry chemical, said apparatus including means for moving the mass in a predetermined direction, a mill for receiving the mass and reducing the size of the pieces of material into particles and mixing the chemical therewith, a housing for receiving the particles and chemical, stationary cylindrical means in said housing for causing the particles and chemicals to flow axially therethrough about said cylindrical means, means whereby steam may be ejected into the housing to dissolve the chemical for absorption by the particles to produce a product, and means operatively associated with said mill for drawing the mass into and through the mill from said moving means and also force the particles and chemical from the mill into the housing and the resultant product therefrom.

6. The apparatus defined in claim 5, including means for ejecting steam outwardly with reference to the longitudinal axis of said cylindrical means into the housing in direct proportion to the density of the absorbent material introduced thereto.

7. Structure comprising means for moving a layer of pieces of absorbent material in a predetermined direction, a dispenser provided with an opening through which a chemical compound of dry chemicals may be discharged onto the layer, means for receiving this material and reducing its size into particles and mixing the compound therewith to provide a mass, a chamber for receiving and additionally mixing the mass and compound, means for conducting steam into the chamber to dissolve the compound for impregnation by the particles of the mass, and means serving to control discharging of the chemicals for mixture with the layer of material and admission of steam to said chamber in direct proportion to the density of the layer conveyed by said moving means.

8. Apparatus for manufacturing insulation of the flowable type comprising: means for reducing the size of an absorbent material into pieces and forming the latter into a layer, a conveyor for directing the material to said reducing means, means for conveying the layer in a predetermined direction, dispenser means for depositing a dry chemical onto the layer in proportion to the density of the layer, a mill for receiving and reducing the size of the pieces into small particles and mixing the chemical therewith to form a relatively fluffy mass, means for receiving and conducting the mass through a chamber, and means for subjecting the mass to steam while being conveyed through the chamber for a period of time sufficient to dissolve the chemical so that it will be absorbed by the majority of the particles to produce an impregnated product.

9. Apparatus for manufacturing insulation of the flowable type comprising: means for reducing the size of an absorbent material into pieces, means for forming the pieces into a layer, a conveyor for directing the material to said reducing means, means for conveying the layer in a predetermined direction, a dispenser for depositing a dry chemical onto the layer while the latter is being conveyed, means for depositing the chemical in proportion to the density of the layer, a mill for receiving and reducing the size of the pieces into small particles and mixing the chemical therewith to form a relatively fluffy mass, means for receiving and conducting the mass through a chamber, means for subjecting the mass to steam while being conveyed through the chamber for a period of time sufficient to dissolve the chemical so that it will be absorbed by the majority of the particles to produce an impregnated product, primary means for receiving and agitating the product, and a secondary means for receiving and conveying the product or discharge into a container.

10. Apparatus for manufacturing insulation of the flowable type comprising: means for reducing the size of an absorbent material into pieces and forming the latter into a layer, a conveyor for directing the material to said reducing means, means for conveying the layer in a predetermined direction, dispenser means for depositing a dry chemical onto the layer in proportion to its density while being conveyed, a mill for receiving and reducing the size of the pieces into small particles and mixing the chemical therewith to form a relatively fluffy mass, means for receiving and conducting the mass through a chamber, and means for subjecting the mass to steam while being conveyed through the chamber for a period of time sufficient to dissolve the chemical so that it will be absorbed by the majority of the particles to produce an impregnated product, means for receiving, agitating and directing the product for discharge into a container, and means for indicating when a predetermined amount of the product is discharged into the container.

11. Apparatus for manufacturing a product, said apparatus comprising means for reducing the size of an absorbent material into pieces, means for receiving and conveying the pieces in a layer in a predetermined direction, means for dispensing a dry chemical onto the layer while it is being conveyed, means for receiving and reducing the size of the pieces into particles and mixing the chemical therewith to form a mass, means for receiving the mass and directing the mass therethrough, and means for ejecting steam into said receiving means while the mass is directed therethrough to dissolve said chemical for absorption by said particles.

12. Apparatus for manufacturing a product, said apparatus comprising means for reducing the size of an absorbent material into pieces, means for receiving and conveying the pieces in a predetermined direction, means for dispensing a dry chemical to the pieces while they are being conveyed, reducer means for receiving and reducing the size of the pieces into particles and mixing the chemical therewith to form a mass, means for receiving the mass and directing the mass therethrough, means for ejecting steam into said receiving means while the mass is directed therethrough to dissolve said chemical for absorption by said particles.

13. The apparatus defined in claim 12, including means operatively connected with all of said means except said reducer means and associated with said dispensing means for automatically rendering all of said means except said reducer means inoperative when the supply of chemical in the dispenser becomes depleted.

14. The apparatus defined in claim 12, including means operatively connecting all of said means excepting said reducer means whereby all of said means excepting said reducer means may be simultaneously started or stopped.

15. Apparatus for manufacturing a product, said apparatus comprising means for reducing the size of an absorbent material into pieces, means for receiving and conveying the pieces in a predetermined direction, means for dispensing a dry chemical to the pieces while they are being conveyed, reducer means for receiving and reducing the size of the pieces into particles and mixing the chemical therewith to form a mass, means for receiving the mass and directing the mass therethrough, means for ejecting steam into said receiving means while the mass is directed therethrough to dissolve said chemical for absorption by said particles, means operatively connected with all of said means except said reducer means and associated with said dispensing means for automatically rendering all of said means excepting said reducer means inoperative when the supply of chemical in the dispensing means becomes depleted, and manually operative means operatively connected to all of said means except said reducer means whereby all of said means excepting said reducer means may be rendered operative or inoperative irrespective of the supply of chemical in said dispensing means.

16. Apparatus for manufacturing a product, said apparatus comprising means for reducing the size of an absorbent material ino pieces, means for receiving and conveying the pieces in a predetermined direction, means for dispensing a dry chemical to the pieces while they are being conveyed, reducer means for receiving and reducing the size of the pieces into particles and mixing the chemical therewith to form a mass, means for receiving the mass and directing the mass therethrough, means for ejecting steam into said receiving means while the mass is directed therethrough to dissolve said chemical for absorption by said particles, and means operatively connected to all of said means except said reducer means and disposed between said conveyor means and said means for reducing the size of the pieces for automatically rendering all of said means excepting said reducer means inoperative when there is an excessive flow of the pieces and chemical to said reducer means.

17. The apparatus defined in claim 16, including manual actuable means operatively connected to all of said means excepting said reducer means operable independently of said means for automatically rendering all of said means excepting said reducer means inoperative for simultaneously rendering all of said means excepting said reducer means operative or inoperative.

18. Apparatus for manufacturing a product, said apparatus comprising means for reducing the size of an absorbent material into pieces, means for receiving and conveying the pieces in a predetermined direction, means for dispensing a dry chemical to the pieces while they are being conveyed, reducer means for receiving and reducing the size of the pieces into particles and mixing the chemical therewith to form a mass, means for receiving the mass and directing the mass therethrough, means for ejecting steam into said receiving means while the mass is directed therethrough to dissolve said chemical for absorption by said particles to form a product, means for receiving and dispensing the product, and means operatively connecting all of said means except said reducer means and associated with said means for receiving and dispensing the product for automatically rendering all of said means excepting said reducer means inoperative when a predetermined quantity of the product is received in said product receiving and dispensing means.

19. The apparatus defined in claim 18, including a pair of means selectively operable and independently of said means for automatically rendering all of said means except said reducer means inoperative whereby all of said means except said reducer means can be rendered operative or inoperative.

20. Apparatus for manufacturing a product, said apparatus comprising first means for reducing the size of an absorbent materal into pieces, means for receiving and conveying the pieces in a predetermined direction, means for dispensing a dry chemical to the pieces while they are being conveyed, means for receiving and reducing the size of the pieces into particles and mixing the chemical therewith to form a mass, means for receiving the mass and directing the mass therethrough, means for ejecting steam into said receiving means while the mass is directed therethrough to dissolve said chemical for absorption by said particles, and means operatively connected to said first-mentioned reducing means, said conveyor means and said dispensing means in a manner whereby said reducing means may be reversely operated and said conveyor means and said dispensing means are rendered inoperative.

21. Apparatus for manufacturing a product, said apparatus comprising reducer means for receiving and reducing the size of pieces of absorbent material into particles and mixing a chemical therewith to form a mass, means through which the mass is conducted, means for ejecting steam into said conducting means while the mass is conducted therethrough to dissolve said chemical for absorption by said particles to form a product, means for receiving and dispensing the product, and means operatively connected to said steam ejecting means and said means for receiving and dispensing the product for automatically rendering said steam ejecting means inoperative when a predetermined quantity of the product is received by said product receiving and dispensing means.

22. Apparatus for manufacturing a product, said apparatus comprising means for reducing the size of pieces of absorbent material into particles and mixing a chemical therewith to form a mass, elongate means for receiving the mass and directing the mass spirally therethrough, means for ejecting steam into said receiving means for passage outwardly with reference to the longitudinal axis of said receiving means into said mass while the mass is directed therethrough to dissolve said chemical for absorption by said particles.

References Cited by the Examiner

UNITED STATES PATENTS

| | | | |
|---|---|---|---|
| 266,700 | 10/1882 | Langlois | 222—242 |
| 588,812 | 8/1897 | Bessonette | 68—5.4 X |
| 738,131 | 9/1903 | Weaver | 239—488 X |
| 1,374,341 | 4/1921 | Vaudreuil | 134—130 X |
| 1,460,519 | 7/1923 | Wadsworth | 19—66 |
| 1,906,664 | 5/1933 | Thorne | 222—240 |
| 1,943,515 | 1/1934 | Davis | 222—241 |
| 2,158,752 | 3/1939 | Fowler | 19—66 |
| 2,592,407 | 4/1952 | Fernandes | 99—80.1 X |
| 2,638,248 | 5/1953 | Alvord | 222—56 |
| 2,639,073 | 5/1953 | Goldberg | 100—151 |
| 2,646,913 | 7/1953 | Goldberg et al. | 100—151 |
| 2,674,396 | 4/1954 | Peterson | 222—56 |
| 2,749,736 | 6/1956 | Powischill | 19—66 X |
| 2,834,058 | 5/1958 | Bryant | 19—66 |
| 2,940,418 | 6/1960 | Penrod et al. | 118—63 |
| 2,940,871 | 6/1960 | Smith-Johannsen | 117—63 |
| 2,981,223 | 4/1961 | Olszowka | 118—63 |
| 3,014,872 | 12/1961 | Scott | 252—62 |
| 3,027,326 | 3/1962 | Moffett | 252—62 |
| 3,034,922 | 5/1962 | Boe | 117—63 |

FOREIGN PATENTS 60,839    2/1892    Germany.

DANIEL BLUM, *Primary Examiner.*

JULIUS GREENWALD, *Examiner.*

SAMUEL BRESCH, *Assistant Examiner.*